United States Patent
Rune et al.

(10) Patent No.: US 11,284,254 B2
(45) Date of Patent: Mar. 22, 2022

(54) SERVICE-BASED 5G CORE AUTHENTICATION ENDPOINTS

(71) Applicant: Telefonaktiebolaget LM Ericsson (publ), Stockholm (SE)

(72) Inventors: Göran Rune, Inköping (SE); Jari Arkko, Kauniainen (FI); Jesus-Angel de-Gregorio-Rodriguez, Madrid (ES); Göran Eriksson, Norrtälje (SE); Magnus Westerlund, Jpplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/047,533

(22) PCT Filed: Apr. 12, 2019

(86) PCT No.: PCT/IB2019/053049
§ 371 (c)(1),
(2) Date: Oct. 14, 2020

(87) PCT Pub. No.: WO2019/198054
PCT Pub. Date: Oct. 17, 2019

(65) Prior Publication Data
US 2021/0112409 A1  Apr. 15, 2021

Related U.S. Application Data

(60) Provisional application No. 62/657,756, filed on Apr. 14, 2018.

(51) Int. Cl.
*H04W 12/06* (2021.01)
*H04W 4/14* (2009.01)

(52) U.S. Cl.
CPC .................................. *H04W 12/06* (2013.01)

(58) Field of Classification Search
CPC ...... H04W 4/14; H04W 12/06; H04L 63/0884
See application file for complete search history.

(56) References Cited

U.S. PATENT DOCUMENTS

2018/0324585 A1* 11/2018 Nair ........................ H04L 63/06
2019/0342851 A1* 11/2019 Shan ..................... H04W 60/04
(Continued)

OTHER PUBLICATIONS

Author Unknown, Technical Specification Group Services and System Aspects; System Architecture for the 5G System; Stage 2 (Release 15); Technical Specification 23.501, Version 15.0.0, 3GPP Organizational Partners, Dec. 2017, 181 pages.
(Continued)

*Primary Examiner* — Khawar Iqbal
(74) *Attorney, Agent, or Firm* — Withrow & Terranova, PLLC

(57) ABSTRACT

Systems and methods that are particularly well-suited for service-based core network endpoint authentication are disclosed. In some embodiments, a method of operation of a network node implementing a second network function in a core network of a cellular communications system comprises receiving, at a main service of the second network function, a request from a first network function for a desired service via Hypertext Transfer Protocol/Representational State Transfer (HTTP/REST) signaling. The request comprises information that identifies one or more delegate endpoints of the first network function that expose one or more delegate services, respectively, of the first network function for providing the desired service using one or more different communication styles. The method further comprises initiating the desired service using a selected delegate endpoint from the one or more delegate endpoints identified by the information comprised in the request.

20 Claims, 12 Drawing Sheets

(56) References Cited

U.S. PATENT DOCUMENTS

| | | | | |
|---|---|---|---|---|
| 2020/0100173 | A1* | 3/2020 | Casati | H04W 12/06 |
| 2020/0163145 | A1* | 5/2020 | Park | H04W 76/18 |
| 2020/0296187 | A1* | 9/2020 | Sabella | H04L 69/08 |
| 2021/0051552 | A1* | 2/2021 | Chong | H04W 36/0022 |
| 2021/0058761 | A1* | 2/2021 | Buckley | H04W 4/90 |
| 2021/0058783 | A1* | 2/2021 | Lei | H04W 12/08 |
| 2021/0143988 | A1* | 5/2021 | Lehtovirta | H04L 63/061 |
| 2021/0314899 | A1* | 10/2021 | Shan | H04W 12/06 |

OTHER PUBLICATIONS

Author Unknown, Technical Specification Group Services and System Aspects; Procedures for the 5G System; Stage 2 (Release 15); Technical Specification 23.502, Version 15.0.0, 3GPP Organizational Partners, Dec. 2017, 258 pages.

Author Unknown, Technical Specification Group Core Network and Terminals; 5G System; Session Management Services Stage 3 (Release 15); Technical Specification 29.502, Version 1.0.0, 3GPP Organizational Partners, Mar. 2018, 76 pages.

Author Unknown, Technical Specification Group Services and System Aspects; Security architecture and procedures for 5G System (Release 15); Technical Specification 33.501, Version 0.7.1, 3GPP Organizational Partners, Jan. 2018, 113 pages.

Author Unknown, Technical Specification Group Services and System Aspects; Security architecture and procedures for 5G System (Release 15); Technical Specification 33.501, Version 15.0.0, 3GPP Organizational Partners, Mar. 2018, 128 pages.

Author Unknown, "Extensible Authentication Protocol," Wikipedia, the free encyclopedia, last modified Oct. 6, 2020, retrieved Oct. 8, 2020 from https://en.wikipedia.org/wiki/Extensible_Authentication_Protocol, 11 pages.

Author Unknown, "gRPC—A high-performance, open source universal RPC framework," gRPC Authors, retrieved Oct. 8, 2020 from https://grpc.io/, 5 pages.

Author Unknown, "HTTP/2," Wikipedia, the free encyclopedia, last modified Oct. 8, 2020, retrieved Oct. 8, 2020 from https://en.wikipedia.org/wiki/HTTP/2, 12 pages.

Author Unknown, "HTTP/2 Server Push," Wikipedia, the free encyclopedia, last modified Feb. 22, 2020, retrieved Oct. 8, 2020 from https://en.wikipedia.org/wiki/HTTP/2_Server_Push, 3 pages.

Author Unknown, "QUIC," Wikipedia, the free encyclopedia, last modified Aug. 28, 2020, retrieved Oct. 8, 2020 from https://en.wikipedia.org/wiki/QUIC, 8 pages.

Author Unknown, "WebSocket," Wikipedia, the free encyclopedia, last modified Aug. 28, 2020, retrieved Oct. 8, 2020 from https://en.wikipedia.org/wiki/WebSocket, 8 pages.

Arkko, J., et al., "Improved Extensible Authentication Protocol Method for 3rd Generation Authentication and Key Agreement (EAP-AKA')," Network Working Group, Request for Comments: 5448, May 2009, 29 pages.

Arkko, J., et al., "Perfect-Forward Secrecy for the Extensible Authentication Protocol Method for Authentication and Key Agreement (EAP-AKA' PFS)," Network Working Group, Internet-Draft, Updates: 5448 (if approved), Oct. 30, 2017, 20 pages.

Grigorik, Ilya, et al., "Introduction to HTTP/2," Web Fundamentals, Google Developers, last modified Sep. 3, 2019, retrieved Oct. 8, 2020 from https://developers.google.com/web/fundamentals/performance/http2, 19 pages.

Nokia et al., "C4-176040: Pseudo-CR on Content-type of multipart message," Third Generation Partnership Project (3GPP), TSG CT4 Meeting #81, Nov. 27-Dec. 1, 2017, 4 pages, Reno, U.S.

International Search Report and Written Opinion for International Patent Application No. PCT/IB2019/053049, dated Jul. 3, 2019, 15 pages.

\* cited by examiner

SERVICE-BASED 5G CORE AUTHENTICATION ENDPOINTS

RELATED APPLICATIONS

This application is a 35 U.S.C. § 371 national phase filing of International Application No. PCT/IB2019/053049, filed Apr. 12, 2019, which claims the benefit of provisional patent application Ser. No. 62/657,756, filed Apr. 14, 2018, the disclosures of which are hereby incorporated herein by reference in their entireties.

TECHNICAL FIELD

The present disclosure relates to a wireless communication system and, in particular, to authentication in a wireless communication system.

BACKGROUND

Third Generation Partnership Project (3GPP) is working on Fifth Generation (5G), and its associated core network that provides services to the connecting users, from authentication to Internet Protocol (IP) address assignment and routing of packets. However, the 5G core network is significantly different from previous generations.

One of the planned changes relates to how User Equipment device (UE) authentication happens in 5G networks. It has been decided that an extensible authentication framework, Extensible Authentication Protocol (EAP), will be used, alongside with the traditional Authentication and Key Agreement (AKA) method. EAP is described in Wikipedia as:

EAP is an authentication framework, not a specific authentication mechanism. It provides some common functions and negotiation of authentication methods called EAP methods. There are currently about 40 different methods defined. [1]

Existing EAP methods, such as EAP-AKA' [2] can be used to support Subscriber Identity Module (SIM) based authentication, but the architecture allows in principle any EAP method to be used to authenticate UEs. Some of the potential other EAP methods include EAP Transport Layer Security (TLS), based on certificates, or EAP Tunneled TLS (TTLS), based on a tunnel authenticated by certificates and inside which passwords or other traditional authentication credentials can be used. Given the open nature of the EAP framework, new methods as well as extensions of existing methods can be relatively easily defined. Ericsson has recently proposed extensions on top of EAP-AKA', such as [5].

Another planned big change in the 5G architecture is to implement a so-called Service-Based Architecture (SBA) [3, 4]. In this new architecture, a number of the interfaces within the core network (including roaming interfaces) are changed from legacy telecom style to modern, web-based Application Program Interfaces (APIs). The details of these APIs are being currently worked on at 3GPP SA2 group, in the 5G core network architecture documents 23.501 [3] and 23.502 [4], as well as in 3GPP Core Network and Terminals (CT) groups. The idea behind SBA is that a number of the interfaces within the core network (including roaming interfaces) are changed from legacy telecom style to modern, web-based APIs. The details of these APIs are being worked on and we can only assume many teams in the world are looking at this topic. And those details matter, as different ways of using web technology will result in large differences in how flexible, easy to secure, future-proof, or efficient 5G core systems will be.

In the context of SBA and the present disclosure, some definitions are useful:

API endpoint: A running instance of an API uniquely identified by a Uniform Resource Locator (URL), said API being used to expose one or more services.

Service producer: An entity offering one or more services.

Service consumer: An entity consuming a service.

Communication style: a combination of interactions between a service consumer and producer, said interaction being layered into functions performed on network, transport, session, and presentation layers, for example using Transmission Control Protocol (TCP), Hypertext Transfer Protocol (HTTP), and API specific messages exchanged using transport and application layer protocols.

The subscriber authentication process is handled with SBA as well. In this process, the SIM card or other credentials in the UE are authenticated against the keys stored in the Unified Data Management (UDM) server at the subscriber's home network. In the serving network, the Access Management Function (AMF) is the entity that handles this process by interacting with the Authentication Service Function (AUSF) that sits in front of the UDM. In this case, the AMF is a service consumer, the AUSF is both a service provider (towards the AMF) and a service consumer (towards the UDM), and the UDM is a service provider.

The UDM selects and provides the selected authentication method to the AUSF. The AUSF will need different services from the AMF when proceeding with the authentication. In case of EAP based authentication, the AUSF executes the authentication and is signaling transparently with the UE. However, for the "traditional" AKA authentication, the AMF is providing the authentication execution service and the AUSF instead provides the security vectors to the AMF so that it can perform the authentication execution service. Consequently, the AUSF needs to select different services in the AMF depending on the selected authentication method. The message transfer service is used for EAP-based authentication, whereas the AKA execution service is used for Authentication Key (AK) authentication. Regardless of which of these services that is being used, the services need to be selected such that they are tied to the same Non-Access Stratum (NAS) signaling protocol state machine for the signaling towards the specific UE.

FIG. 1 illustrates an example 3GPP registration sequence that shows how Representational State Transfer (REST) could be used for authentication. Note that the registration sequence above is for illustration purposes since the 3GPP network has not proceeded to the end on this on this topic yet. The sequence in FIG. 1 is created based on signaling sequences in references [4] and [6] in combination with assumptions on how REST based interfaces will be realized by 3GPP.

In 3GPP it has been decided to use RESTful API design style wherever possible, with the following agreements governing the APIs:

Main protocol: HTTP/2
Transport protocol: TCP
Data serialization format: JavaScript Object Notation (JSON)
Server-initiated interactions: "Web-hook"
Interface Definition Language: OpenAPI 3.0.0 (formerly known as "Swagger")

The above is thus defining most aspects of a communication style.

There currently exist certain challenge(s). The conversion of the 3GPP call flows into REST-based interfaces between the network functions is not always straightforward. Using the pattern request/response or pub/sub does not really match the typical three-way handshake of EAP that well. However, since the 3GPP specification work on SBA for 5G Core (5GC) is targeting RESTful interfaces, the possibility is missing to in a more flexible way select a communication style, e.g. using web sockets or Quick User Datagram Protocol (UDP) Internet Connection (QUIC) streams as a transport, which supports a session layer more suitable to a certain procedure.

In particular, the EAP conversation is between the AUSF and the UE using REST-based request/response message operations and may not work well with the delay in response from a UE potentially being larger than acceptable for a typical REST procedure response. In addition, EAP messages are binary messages and have to be converted to suitable format to be transported in the REST messages (e.g., base-64). Some messaging exchanges in some EAP methods are also lengthy, which means that potentially dozens of messages have to be transported in this manner.

Certain aspects of the present disclosure and their embodiments may provide solutions to the aforementioned or other challenges. The present disclosure proposes the separation of the endpoints of the signaling to initiate an authentication exchange and the actual exchange of authentication messages and placing the latter on a dedicated channel that is optimal for the individual binary data exchange instance.

Such separation provides a more natural fit to the problem than the currently planned REST-only design in 3GPP. This allows the use of web sockets or independent stream communications in HTTP2/QUIC.

In general, it is proposed that the AMF and AUSF initiate the authentication process but delegate the actual authentication exchange to other parties (such as modules or separate subservices within themselves). This actual authentication exchange can then run independent from the HTTP/REST signaling between the AMF and AUSF, and (for instance) employ other means of communication best suited for this task.

Embodiments of the present disclosure provide an extensible system design, where a network function A holding an interface with the Radio Access Network (RAN) and the UE (e.g., in 5GC in 3GPP Release 15, the AMF) requesting service from a network function B provides information on endpoints that may be for services related to the RAN and UE, e.g. message transfer endpoints and 5G AKA execution service relevant for a specific user (the user that the request towards network function B is related to).

There are, proposed herein, various embodiments which address one or more of the issues disclosed herein.

Certain embodiments may provide one or more of the following technical advantage(s). This solution has several main benefits. First, it allows the actual authentication process to be performed by separate entities other than the main AMF/AUSF process. This provides the following benefits:

The service can be further split into parts and distributed in any desired manner.

Different service aspects (e.g., AKA or EAP authentication) do not need to reside in the same piece of code and can be developed, deployed, and operated separately.

The communication can go directly to the right party. For instance, relaying EAP communication at the AMF between the UE and the AUSF is a very simple task and can be performed efficiently by a small separate service.

The separation also indirectly makes it possible to choose the communication style best tailored for the task. For instance, passing EAP messages can be done with a HTTP/REST type interface, but is perhaps most conveniently done as a binary message exchange over a binary channel. This relieves the need to translate messages to base-64, map them to HTTP or JSON data structures, etc.

The communication style that could be used for the authentication process could include HTTP/2 or QUIC streams [7], [8], [11], Server Push [9], Websockets [10], gRPC Remote Procedure Call (gRPC) based messaging [12], or simply native communication over sockets for instance.

The UE and AMF (service consumer) can more flexibly provide constraints affecting the choice of the authentication method as well as the communication style to be used with the service provider (AUSF).

SUMMARY

Systems and methods that are particularly well-suited for service-based core network endpoint authentication are disclosed. In some embodiments, a method of operation of a network node implementing a second network function in a core network of a cellular communications system comprises receiving, at a main service of the second network function, a request from a first network function for a desired service via Hypertext Transfer Protocol/Representational State Transfer (HTTP/REST) signaling. The request comprises information that identifies one or more delegate endpoints of the first network function that expose one or more delegate services, respectively, of the first network function for providing the desired service using one or more different communication styles. The method further comprises initiating the desired service using a selected delegate endpoint from the one or more delegate endpoints identified by the information comprised in the request.

In some embodiments, the communication style used by the selected delegate endpoint is a communication style that is different than HTTP/REST such that initiating the desired service using the selected delegate endpoint switches the communication style for signaling related to the desired service from HTTP/REST to the communication style used by the selected delegate endpoint.

In some embodiments, the communication style used by the selected delegate endpoint is a communication style that supports binary message exchange over a binary channel. Further, in some embodiments, the communication style used by the selected delegate endpoint is HTTP/2, Quick User Datagram Protocol (UDP) Internet Connection (QUIC) stream, Server Push, Websocket, gRPC Remote Procedure Call (gRPC) based messaging, or a native communication style over sockets.

In some embodiments, the one or more delegate endpoints for providing the desired service using the one or more different communication styles comprise a first delegate endpoint that uses a first communication style for the desired service and a second delegate endpoint that uses a second communication style for the desired service. Further, in some embodiments, at least one of the first communication style and the second communication style is a communication style that supports binary message exchange over a binary channel.

In some embodiments, the desired service is authentication of a particular User Equipment (UE), the first network function is an Access Management Function (AMF) in a serving network of the UE, and the second network function is an Authentication Service Function (AUSF) in front of a Unified Data Management (UDM) in a home network of the UE.

In some embodiments, the one or more delegate endpoints comprise a delegate endpoint for an Extensible Authentication Protocol (EAP) authentication relay service for relaying EAP related messages between the UE and the AUSF using a communication style that supports binary message exchange over a binary channel, and the selected delegate endpoint is the delegate endpoint for the EAP authentication relay service. Further, in some embodiments, the communication style that supports binary message exchange over a binary channel is HTTP/2, QUIC stream, Server Push, Websocket, gRPC based messaging, or a native communication style over sockets.

In some embodiments, initiating the desired service using the selected delegate endpoint comprises sending, to a delegate endpoint of the AUSF, a request to launch the authentication of the UE using the selected delegate endpoint of the AMF and sending, to a main endpoint of the AMF that exposes the main service of the AMF via HTTP/REST signaling, a message that indicates launch of EAP authentication of the UE. Further, in some embodiments, the method further comprises receiving, from the delegate endpoint of the AUSF, a response that indicates that the authentication of the UE was successful; sending, to the main endpoint of the AMF via HTTP/REST signaling, a message that indicates that the authentication of the UE was successful; and receiving an acknowledgement from the main endpoint of the AMF via HTTP/REST signaling.

In some embodiments, initiating the desired service using the selected delegate endpoint comprises sending, to a main endpoint of the AMF that exposes the main service of the AMF via HTTP/REST signaling, a message that indicates launch of EAP authentication of the UE. Further, in some embodiments, the method further comprises sending, to the selected delegate endpoint of the AMF via the communication style that supports binary message exchange over a binary channel, an EAP Request/Challenge to be relayed to the UE; receiving, from the selected delegate endpoint of the AMF via the communication style that supports binary message exchange over a binary channel, an EAP response relayed from the UE; sending, to the selected delegate endpoint of the AMF via the communication style that supports binary message exchange over a binary channel, an EAP Success message to be relayed to the UE; sending, to the main endpoint of the AMF via HTTP/REST signaling, a message that indicates that the authentication of the UE was successful; and receiving, from the main endpoint of the AMF via HTTP/REST signaling, an acknowledgement.

In some embodiments, the one or more delegate endpoints of the AMF comprise a first delegate endpoint for an EAP authentication relay service for relaying EAP related messages between the UE and the AUSF using a first communication style that supports binary message exchange over a binary channel, and a second delegate endpoint for a Fifth Generation (5G) Authentication and Key Agreement (AKA) authentication endpoint service for exchanging 5G AKA related messages with the AUSF or another endpoint associated with the AUSF using a second communication style.

The method further comprises determining whether an EAP authentication scheme or a 5G AKA authentication scheme is to be used to authenticate the UE, selecting the first delegate endpoint of the AMF if the EAP authentication scheme is determined to be used for authenticating the UE, and selecting the second delegate endpoint of the AMF if the 5G AKA authentication scheme is determined to be used for authenticating the UE.

In some embodiments, the EAP authentication scheme is determined to be used for authenticating the UE, and initiating the desired service using the selected delegate endpoint of the AMF comprises sending a message to a delegate endpoint of the AUSF to request launch of the authentication of the UE using the selected delegate endpoint of the AMF, and sending, to a main endpoint of the AMF that exposes the main service of the AMF, a message to launch the authentication of the UE using the selected delegate endpoint of the AMF. In some embodiments, the method further comprises receiving, from the delegate endpoint of the AUSF, a response that indicates that the authentication of the UE was successful; sending, to the main endpoint of the AMF via HTTP/REST signaling, a message that indicates that the authentication of the UE was successful; and receiving, from the main endpoint of the AMF via HTTP/REST signaling, an acknowledgement.

In some embodiments, the EAP authentication scheme is determined to be used for authenticating the UE, and initiating the desired service using the selected delegate endpoint of the AMF comprises sending, to a main endpoint of the AMF that exposes the main service of the AMF via HTTP/REST signaling, a message that indicates launch of EAP authentication of the UE. In some embodiments, the method further comprises sending, to the selected delegate endpoint of the AMF via the first communication style that supports binary message exchange over a binary channel, an EAP Request/Challenge to be relayed to the UE; receiving, from the selected delegate endpoint of the AMF via the first communication style that supports binary message exchange over a binary channel, an EAP response relayed from the UE; sending, to the selected delegate endpoint of the AMF via the first communication style that supports binary message exchange over a binary channel, an EAP Success message to be relayed to the UE; sending, to the main endpoint of the AMF via HTTP/REST signaling, a message that indicates that the authentication of the UE was successful; and receiving, from the main endpoint of the AMF via HTTP/REST signaling, an acknowledgement.

In some embodiments, the 5G AKA authentication scheme is determined to be used for authenticating the UE, and initiating the desired service using the selected delegate endpoint of the AMF comprises sending, to the selected delegate endpoint of the AMF via the second communication style, a request to launch 5G AKA authentication for the UE. In some embodiments, the method further comprises receiving, from the selected delegate endpoint of the AMF via the second communication style, a response that indicates that the authentication of the UE was a success; sending, to the main endpoint of the AMF via HTTP/REST signaling, a message that indicates that the authentication of the UE was successful; and receiving, from the main endpoint of the AMF via HTTP/REST signaling, an acknowledgement.

Embodiments of a network node for implementing a second network function in a core network of a cellular communications system are also provided. In some embodiments, a network node implementing a second network function in a core network of a cellular communications system is adapted to receive, at a main service of the second network function, a request from a first network function for a desired service via HTTP/REST signaling. The request comprises information that identifies one or more delegate endpoints of the first network function that expose one or more delegate services, respectively, of the first network function for providing the desired service using one or more different communication styles. The network node is further adapted to initiate the desired service using a selected delegate endpoint from the one or more delegate endpoints identified by the information comprised in the request.

In some embodiments, a network node for implementing a second network function in a core network of a cellular communications system comprises one or more processors and memory comprising instructions executable by the one or more processors whereby the network node is operable to receive, at a main service of the second network function, a request from a first network function for a desired service via HTTP/REST signaling. The request comprises information that identifies one or more delegate endpoints of the first network function that expose one or more delegate services, respectively, of the first network function for providing the desired service using one or more different communication styles. Via execution of the instructions by the one or more processors, the network node is further operable to initiate the desired service using a selected delegate endpoint from the one or more delegate endpoints identified by the information comprised in the request.

Embodiments of a method of operation of a network node implementing a first network function in a core network of a cellular communications system are also disclosed. In some embodiments, a method of operation of a network node implementing a first network function in a core network of a cellular communications system comprises sending, to a main endpoint of a second network function that exposes a main service of the second network function, a request for a desired service via HTTP/REST signaling. The request comprises information that identifies one or more delegate endpoints of the first network function that expose one or more delegate services, respectively, of the first network function for providing the desired service using one or more different communication styles. The method further comprises receiving, from the main endpoint of the second network function via HTTP/REST signaling, a message that initiates launch of the desired service using a selected delegate endpoint from the one or more delegate endpoints identified by the information comprised in the request.

In some embodiments, the communication style used by the selected delegate endpoint is a communication style that is different than HTTP/REST such that initiating the desired service using the selected delegate endpoint switches the communication style for signaling related to the desired service from HTTP/REST to the communication style used by the selected delegate endpoint.

In some embodiments, the communication style used by the selected delegate endpoint is a communication style that supports binary message exchange over a binary channel. Further, in some embodiments, the communication style used by the selected delegate endpoint is HTTP/2, QUIC stream, Server Push, Websocket, gRPC based messaging, or a native communication style over sockets.

In some embodiments, the one or more delegate endpoints for providing the desired service using the one or more different communication styles comprise a first delegate endpoint that uses a first communication style for the desired service and a second delegate endpoint that uses a second communication style for the desired service. In some embodiments, at least one of the first communication style and the second communication style is a communication style that supports binary message exchange over a binary channel.

In some embodiments, the desired service is authentication of a particular UE, the first network function is an AMF in a serving network of the UE, and the second network function is an AUSF in front of a UDM in a home network of the UE.

Embodiments of a network node implementing a first network function in a core network of a cellular communications system are also disclosed. In some embodiments, a network node implementing a first network function in a core network of a cellular communications system is adapted to send, to a main endpoint of a second network function that exposes a main service of the second network function, a request for a desired service via HTTP/REST signaling. The request comprises information that identifies one or more delegate endpoints of the first network function that expose one or more delegate services, respectively, of the first network function for providing the desired service using one or more different communication styles. The network node is further adapted to receive, from the main endpoint of the second network function via HTTP/REST signaling, a message that initiates launch of the desired service using a selected delegate endpoint from the one or more delegate endpoints identified by the information comprised in the request.

In some embodiments, a network node implementing a first network function in a core network of a cellular communications system comprises one or more processors and memory comprising instructions executable by the one or more processors whereby the network node is operable to send, to a main endpoint of a second network function that exposes a main service of the second network function, a request for a desired service via HTTP/REST signaling. The request comprises information that identifies one or more delegate endpoints of the first network function that expose one or more delegate services, respectively, of the first network function for providing the desired service using one or more different communication styles. By execution of the instructions by the one or more processors, the network node is further operable to receive, from the main endpoint of the second network function via HTTP/REST signaling, a message that initiates launch of the desired service using a selected delegate endpoint from the one or more delegate endpoints identified by the information comprised in the request.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 2:
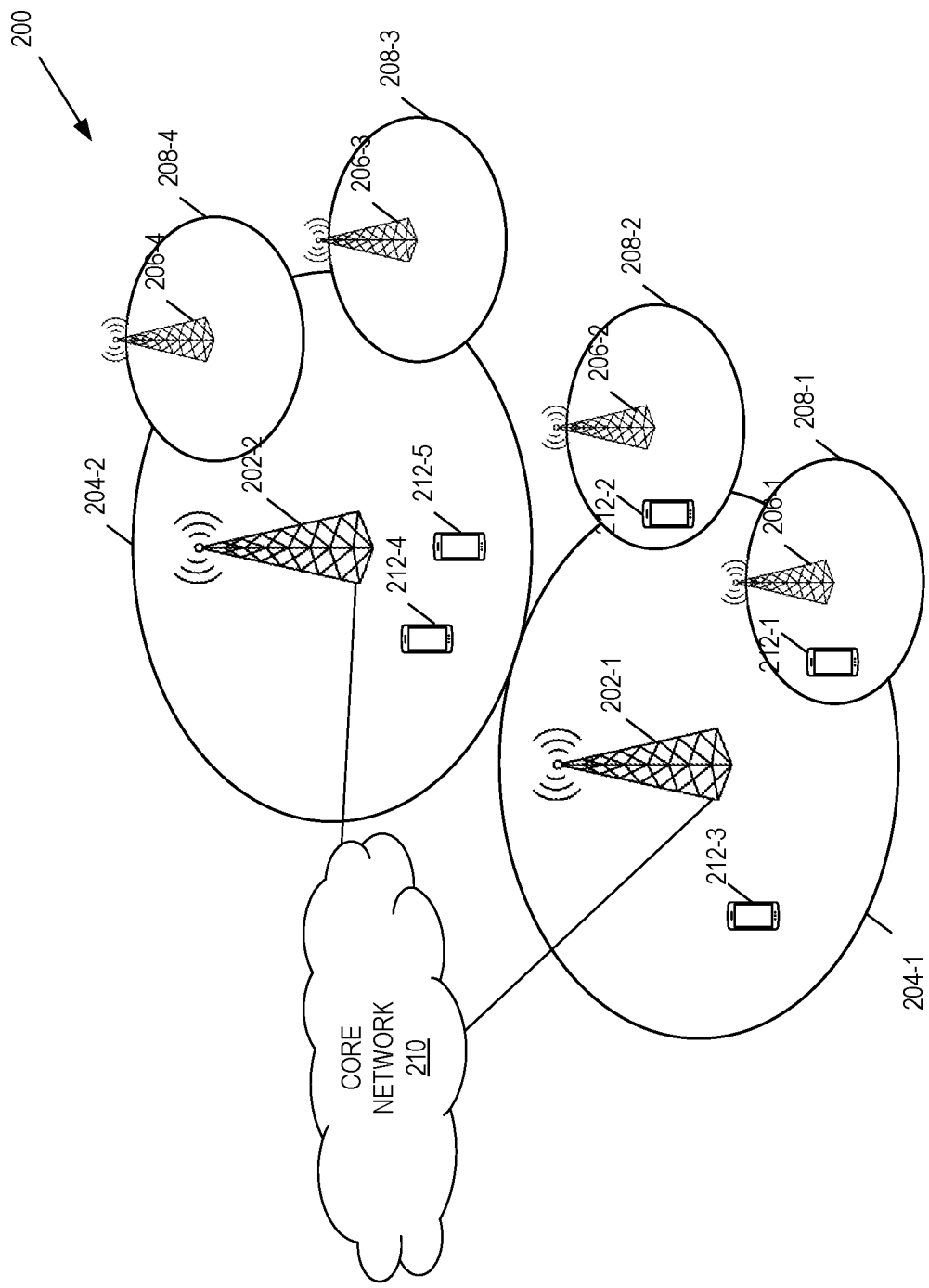
FIG. 2 illustrates one example of a cellular communications system according to some embodiments of the present disclosure.

FIG. 2 illustrates one example of a cellular communications system 200 according to some embodiments of the present disclosure. In the embodiments described herein, the cellular communications system 200 is a Fifth Generation (5G) New Radio (NR) network, which is also referred to as a 5G system (5GS). As commonly understood, the 5GS includes a 5G Radio Access Network (RAN) (also referred to as a Next Generation RAN (NG-RAN) or a NR RAN). In this example, the RAN of the cellular communications system 200 includes base stations 202-1 and 202-2, which in 5G NR are referred to as NR Base Stations (gNBs), controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G core (5GC). The base stations 202 (and optionally the low power nodes 206) are connected to the core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as User Equipment devices (UEs).

Figure 3:
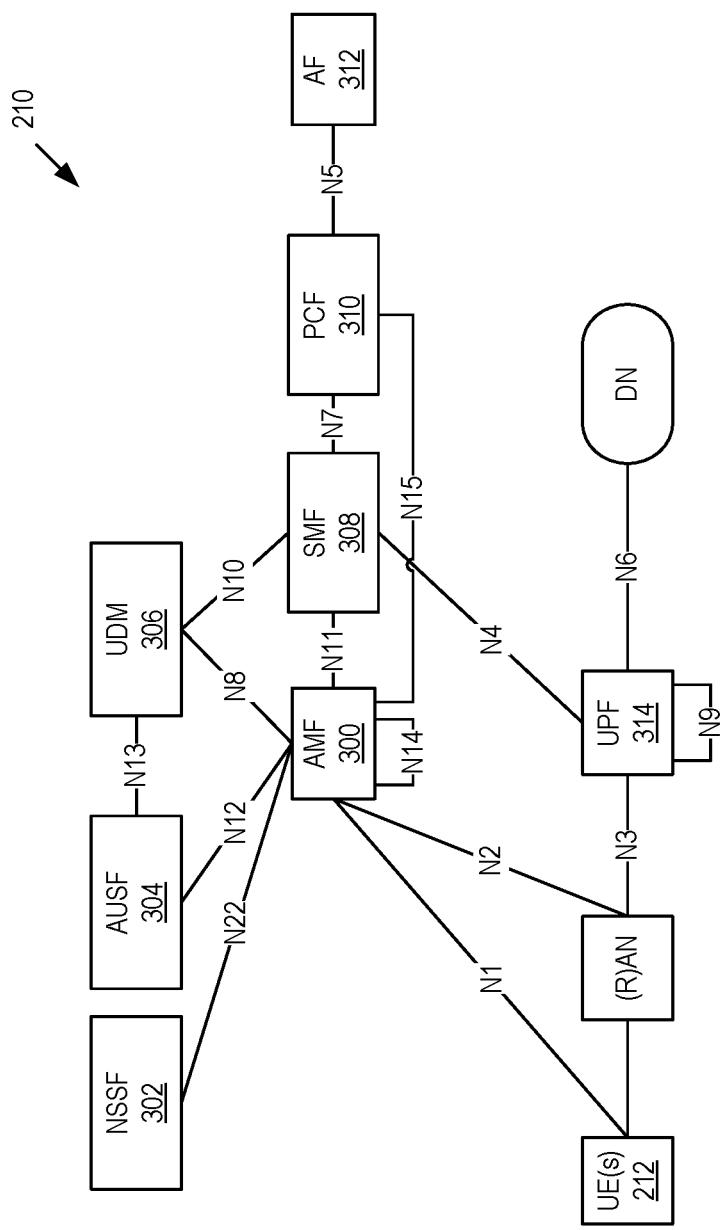
FIG. 3 illustrates a wireless communication system represented as a Fifth Generation (5G) network architecture composed of core Network Functions (NFs), where interaction between any two NFs is represented by a point-to-point reference point/interface.

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the cellular communications system 200 of FIG. 2.

Seen from the access side the 5G network architecture shown in FIG. 3 comprises a plurality of UEs 212 connected to the RAN (i.e., to a base station(s) 202 or low power node(s) 206) as well as an Access Management Function (AMF) 300. Seen from the core network side, the 5GC (corresponds to the core network 210 of FIG. 2) includes core NFs. The core NFs shown in FIG. 3 include a Network Slice Selection Function (NSSF) 302, an Authentication Service Function (AUSF) 304, a Unified Data Management (UDM) 306, the AMF 300, a Session Management Function (SMF) 308, a Policy Control Function (PCF) 310, an Application Function (AF) 312, and a User Plane Function (UPF) 314.

Reference point representations of the 5G network architecture are used to develop detailed call flows in the normative standardization. The N1 reference point is defined to carry signaling between the UE(s) 212 and the AMF 300. The reference points for connecting between the RAN and the AMF 300 and between the RAN and the UPF 314 are defined as N2 and N3, respectively. There is a reference point, N11, between the AMF 300 and the SMF 308, which implies that the SMF 308 is at least partly controlled by the AMF 300. N4 is used by the SMF 308 and the UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and the SMF 308, respectively. N12 is required for the AMF 300 to perform authentication of the UE 212. N8 and N10 are defined because the subscription data of the UE 212 is required for the AMF 300 and the SMF 308.

The 5G core network aims at separating user plane and control plane. The user plane carries user traffic while the control plane carries signaling in the network. In FIG. 3, the UPF 314 is in the user plane and all other NFs, i.e., the AMF 300, the SMF 308, the PCF 310, the AF 312, the NSSF 302, the AUSF 304, and the UDM 306, are in the control plane. Separating the user and control planes guarantees each plane resource to be scaled independently. It also allows the UPFs 314 to be deployed separately from control plane functions in a distributed fashion. In this architecture, the UPFs 314 may be deployed very close to the UEs 212 to shorten the Round Trip Time (RTT) between the UEs 212 and a Data Network (DN) for some applications requiring low latency.

The core 5G network architecture is composed of modularized functions. For example, the AMF 300 and the SMF 308 are independent functions in the control plane. Separating the AMF 300 and the SMF 308 allows independent evolution and scaling. Other control plane functions like the PCF 310 and the AUSF 304 can be separated as shown in FIG. 3. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs 314.

Figure 4:
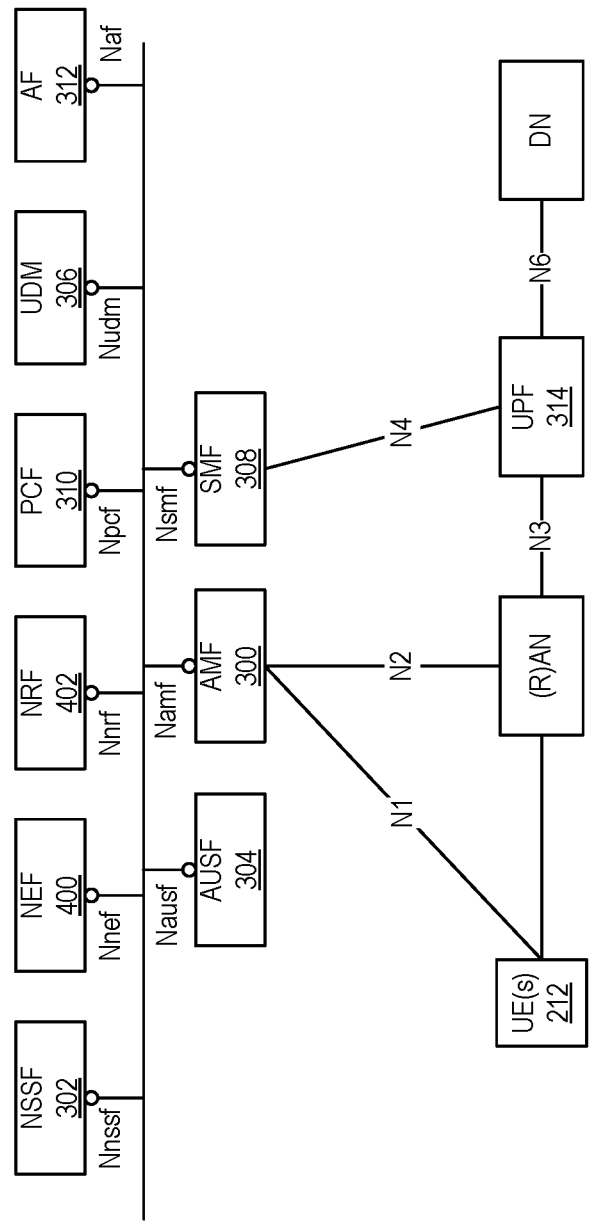
FIG. 4 illustrates a 5G network architecture using service-based interfaces between the NFs in the control plane, instead of the point-to-point reference points/interfaces used in the 5G network architecture of FIG. 3.

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g. Namf for the service based interface of the AMF 300 and Nsmf for the service based interface of the SMF 308, etc. A Network Exposure Function (NEF) 400 and a Network Repository Function (NRF) 402 in FIG. 4 are not shown in FIG. 3 discussed above. However, it should be clarified that all NFs depicted in FIG. 3 can interact with the NEF 400 and the NRF 402 of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, etc. A UE 212 even using multiple access technologies is basically connected to a single AMF 300 because the AMF 300 is independent of the access technologies. The SMF 308 is responsible for session management and allocates Internet Protocol (IP) addresses to UEs 212. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support Quality of Service (QoS). Based on the information, the PCF 310 determines policies about mobility and session management to make the AMF 300 and the SMF 308 operate properly. The AUSF 304 supports authentication function for UEs 212 or similar and thus stores data for authentication of UEs 212 or similar while the UDM 306 stores subscription data of the UE 212. The DN, which is not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

In some embodiments, the present disclosure relates to the separation of the endpoints of the signaling to initiate an authentication exchange and the actual exchange of authentication messages and placing the latter on a dedicated channel that is optimal for the individual binary data exchange instance. More specifically, in some embodiments, the overall sequence is as follows:

1. A main service of the AMF 300 (referred to herein as an AMF_Main service) has a corresponding endpoint (referred to herein as an AMF_Main endpoint). The AMF_Main service allocates an endpoint(s) (also referred to herein as a delegate endpoint(s) of the AMF 300) to be used in case of 5G-Authentication and Key Agreement (AKA) and makes a Representational State Transfer (REST) request to a main service of the AUSF 304 (referred to herein as an AUSF_Main service) via a corresponding endpoint of the AUSF 304 (referred to herein as an AUSF_Main endpoint) to start an authentication process.

2. The AUSF_Main service decides what authentication scheme to apply, and responds by initiating the decided authentication scheme using a corresponding set of endpoints. On the AUSF 304 side, the endpoint can be an endpoint of an instance of the AUSF implementation of Extensible Authentication Protocol (EAP) for that particular subscriber. This endpoint is referred to herein as a delegate endpoint of the AUSF 304 called an AUSF_EAPEP endpoint. On the AMF 300 side, the endpoint can be an endpoint of a service that is a representation of a "messaging tunnel" to the UE 212 in question. This endpoint is referred to herein as a delegate endpoint of the AMF 300 called an AMF_RelayEP endpoint.

3. The AUSF_EAPEP and AMF_RelayEP services run through an EAP or 5G-AKA (depending on selected scheme) messaging exchange via the respective AUSF_EAPEP and AMF_RelayEP endpoints.

4. The AUSF_Main service notifies with the AMF_Main service about the successful completion of the authentication exchange. This can happen, for instance, via a REST operation (i.e., REST signaling) via the respective AUSF_Main and AMF_Main endpoints.

There may be a difference between EAP and regular AKA authentication processes; it may be that the former is handled with the separate endpoints as suggested above and that the latter is a mere REST exchange due to its simplicity.

Figure 5A:
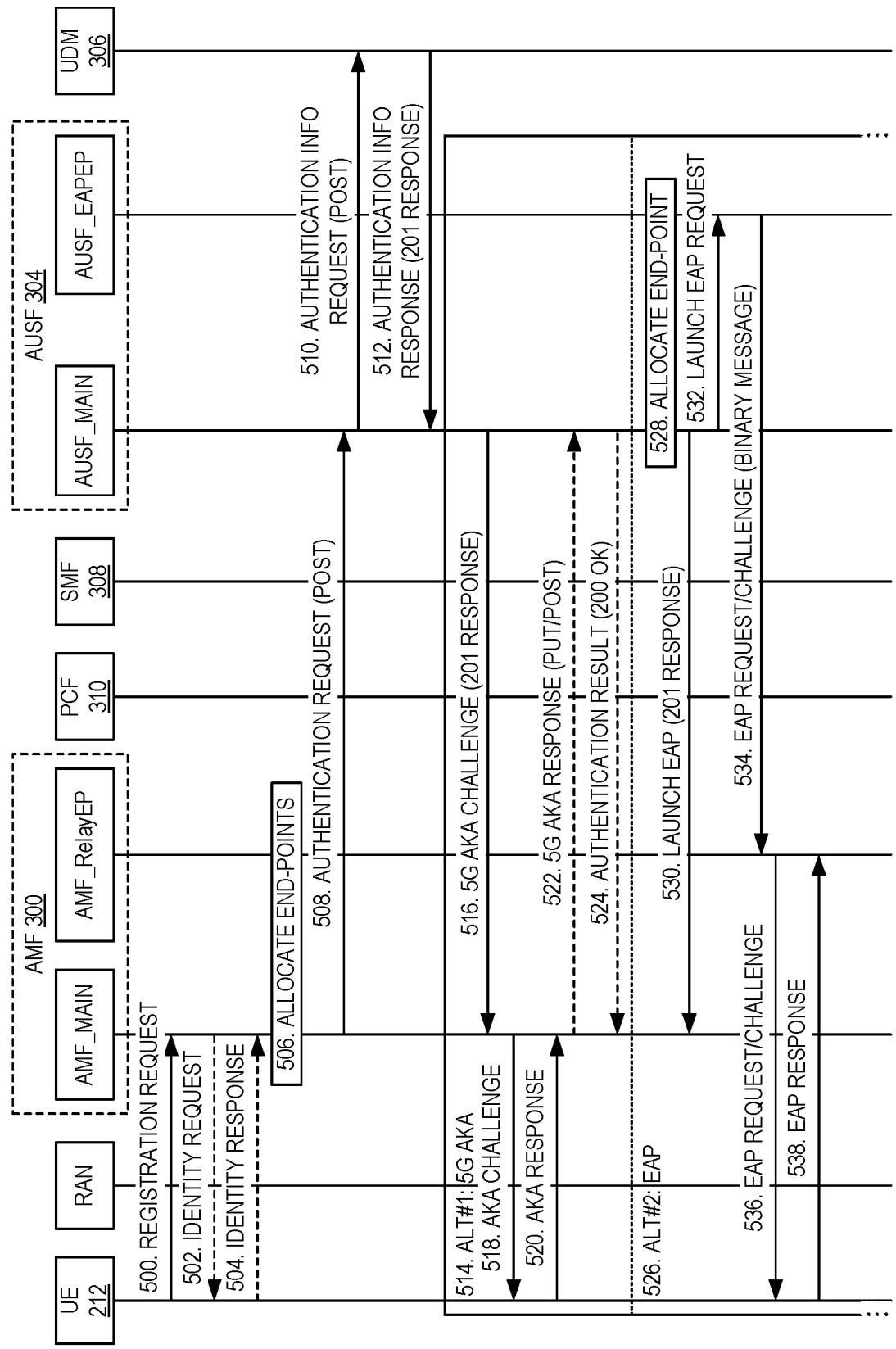
FIGS. 5A and 5B illustrate an authentication process in accordance with some embodiments of the present disclosure.
Figure 5B:
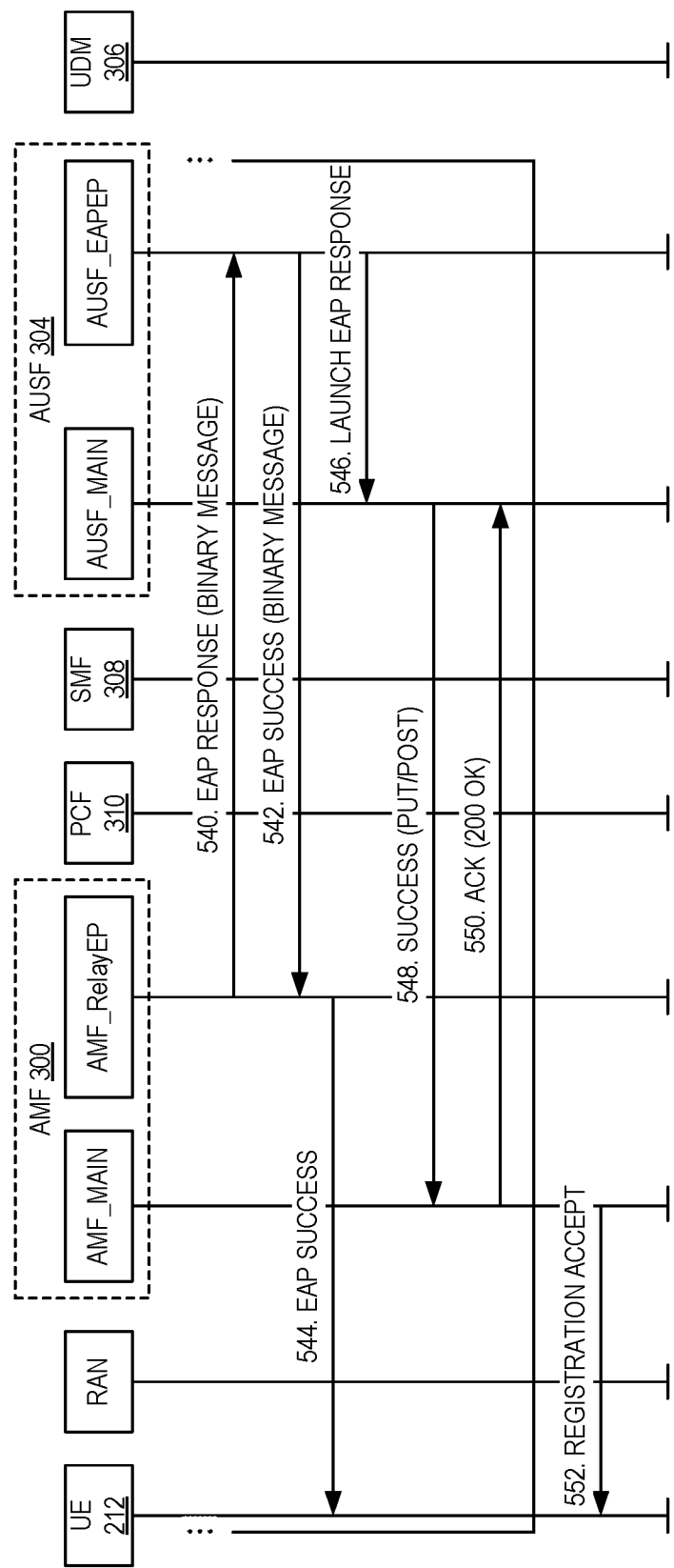

FIGS. 5A and 5B illustrate the process. Note that, in FIGS. 5A and 5B, a single block named "AMF_Main" represents both the AMF_Main service and the AMF_Main endpoint (Application Program Interface (API) instance). Likewise, a single block named "AMF_RelayEP" represents both the AMF_RelayEP service and the AMF_RelayEP endpoint (API instance); a single block "AUSF_Main" represents both the AUSF_Main service and the AUSF_Main endpoint (API instance); and a single block named "AUSF_EAPEP" represents both the AUSF_EAPEP service and the AUSF_EAPEP endpoint (API instance). Optional steps are represented with dashed lines.

The process begins with the UE 212 registering to the network (step 500). Optionally, the AMF_Main service sends an identity request to the UE 212 (step 502) and receives a corresponding identity response from the UE 212 (step 504). The AMF_Main service allocates one or more delegate endpoints of the AMF 300 for the registration process (step 506). Here, the AMF_Main service allocates the AMF_RelayEP endpoint. Ultimately, the AMF_Main service makes an authentication request to the AUSF_Main service via the AUSF_Main endpoint using a REST interface (step 508). This request goes to the AUSF_Main service, whose task is to handle authentication. The AUSF_Main service sends an Authentication Info Request to the UDM 306 via HTTP/REST signaling (step 510) and receives an Authentication Info Response from the UDM 306 via HTTP/REST signaling (step 512). Using the information received from the UDM 306, the AUSF_Main service decides, in this example, whether to perform authentication of the UE 212 using a native AKA authentication process (labelled as box 514) or an EAP authentication process (labelled as box 526).

Figure 1:
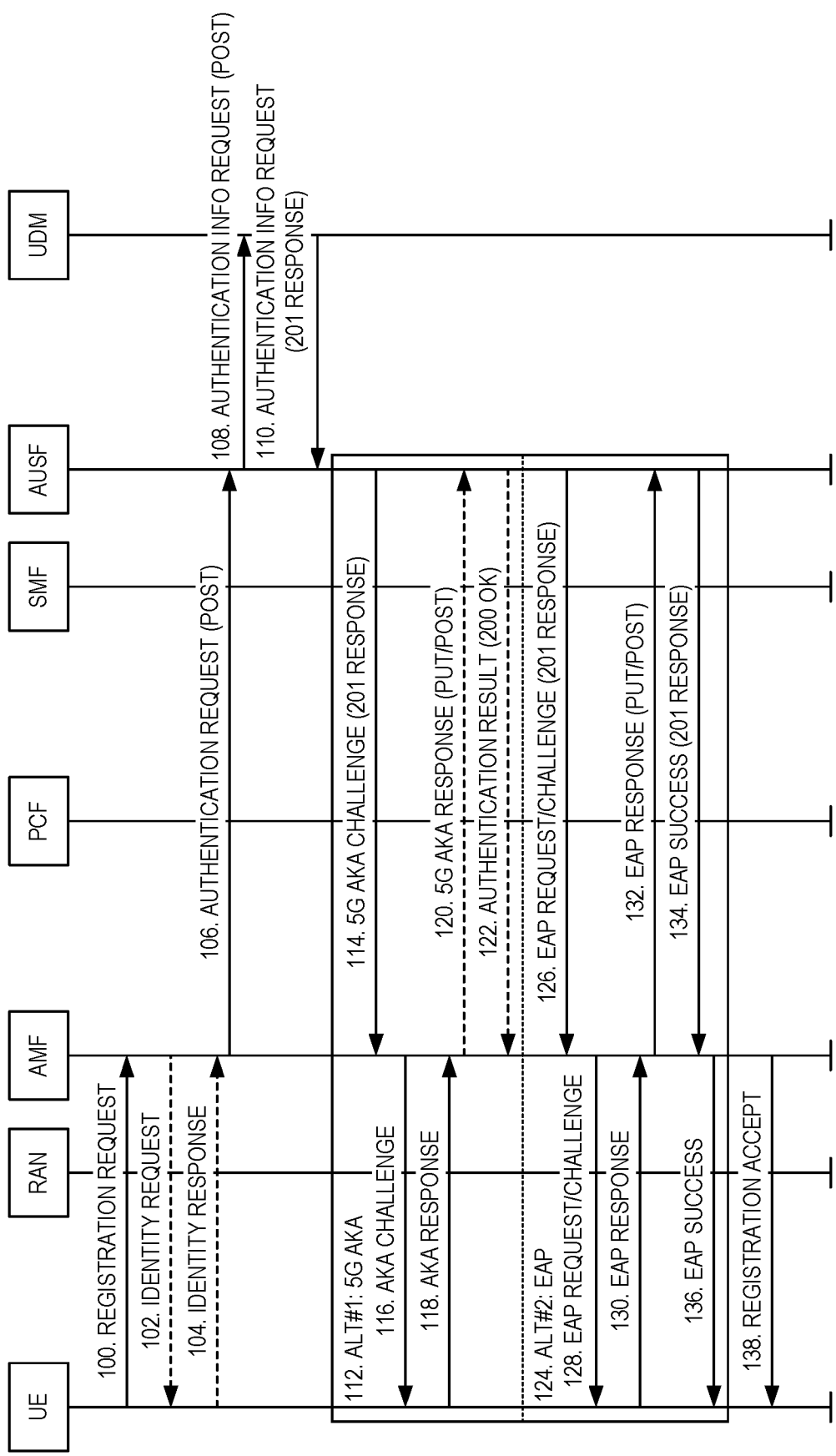
FIG. 1 illustrates an example Third Generation Partnership Project (3GPP) registration sequence that shows how Representational State Transfer (REST) could be used for authentication.

If the AUSF_Main service decides to use the native AKA authentication process, in the example of FIG. 5A, for the purpose of illustration, it is assumed that the native AKA authentication process takes place using the same REST interface between the AUSF_Main service and the AMF_Main service as described above and illustrated in FIG. 1. In particular, native AKA authentication is shown as alternative 1 (Alt #1) in FIG. 5A (steps 516-524), and this native AKA authentication is the same as that shown as alternative 1 in FIG. 1.

If the AUSF_Main service decides to use the EAP authentication process, EAP authentication is performed using separate endpoints as follows. For EAP, in alternative 2 (Alt #2), the process of FIGS. 5A and 5B illustrates the delegation of the authentication process to separate services, where the AMF_Main service provides a delegate endpoint for a separate service available to relay messages from any service on the network side to the UE 212, i.e. the AMF_RelayEP endpoint for the AMF_RelayEP service, to the AUSF_Main service in the request for the Authentication process. In effect, this would be a relay between the connection to the AUSF_EAPEP service and the Non-Access Stratum (NAS) protocol that carries EAP to the UE 212.

In the example in FIGS. 5A and 5B, separate services and respective endpoints are shown on both the AUSF 304 and AMF 300 sides. These services are the AMF_RelayEP service exposed by the respective AMF_RelayEP endpoint and the AUSF_EAPEP service exposed by the AUSF_EAPEP endpoint, in our example. The purpose of the AUSF_EAPEP service is to do the actual EAP authentication as the EAP server. The new way of executing the authentication in alternative 2 (i.e., for EAP) is shown as steps 530-550, where steps 532 and 544 represent invoking the AUSF_EAPEP service via the respective AUSF_EAPEP endpoint and reporting the result. In another embodiment of the present disclosure, the AUSF_EAPEP service and the AUSF_Main service are one and the same service, in which case steps 532 and 544 would not be needed.

Specifically, as illustrated in FIGS. 5A and 5B, the AUSF_Main service has received the Authentication Request from the AMF_Main service via the AUSF_Main endpoint and selected EAP as the authentication scheme. As such, the AUSF_Main service, in this example, allocates the AUSF_EAPEP service and the respective AUSF_EAPEP endpoint for authentication for this particular UE 212 (step 528) and sends a Launch EAP request or message to the AMF_Main service via HTTP/REST signaling (step 530). The AUSF_Main service also sends a Launch EAP Request to the AUSF_EAPEP service (step 532). This Launch EAP Request includes information regarding the AMF_RelayEP endpoint for the EAP authentication. The AUSF_EAPEP service and the UE 212 then communicate via the AMF_RelayEP service using a desired communication style (e.g., a communication style that supports binary messages over a binary channel) to perform EAP authentication. In this particular example, the AUSF_EAPEP service sends an EAP Request/Challenge to the AMF_RelayEP via the respective AMF_RelayEP endpoint (API instance), which then relays the EAP Request/Challenge to the UE 212 (steps 534 and 536). The UE 212 sends an EAP Response to the AMF_RelayEP service, which then relays the EAP Response to the AUSF_EAPEP (steps 538 and 540). In this example, authentication is successful, and the AUSF_EAPEP service sends an EAP Success to the AMF_RelayEP via the respective AMF_RelayEP endpoint, which then relays the EAP Success to the UE 212 (steps 542 and 544). The AUSF_EAPEP service also sends a Launch EAP Response to the AUSF_Main service to indicate successful authentication (step 546). The AUSF_Main service sends a Success message to the AMF_Main service via HTTP/REST signaling (step 548), and the AMF_Main service sends an ACK to the AUSF_Main via HTTP/REST signaling (step 550). The AMF_Main service then sends a Registration Accept message to the UE 212 (step 552).

Figure 6A:
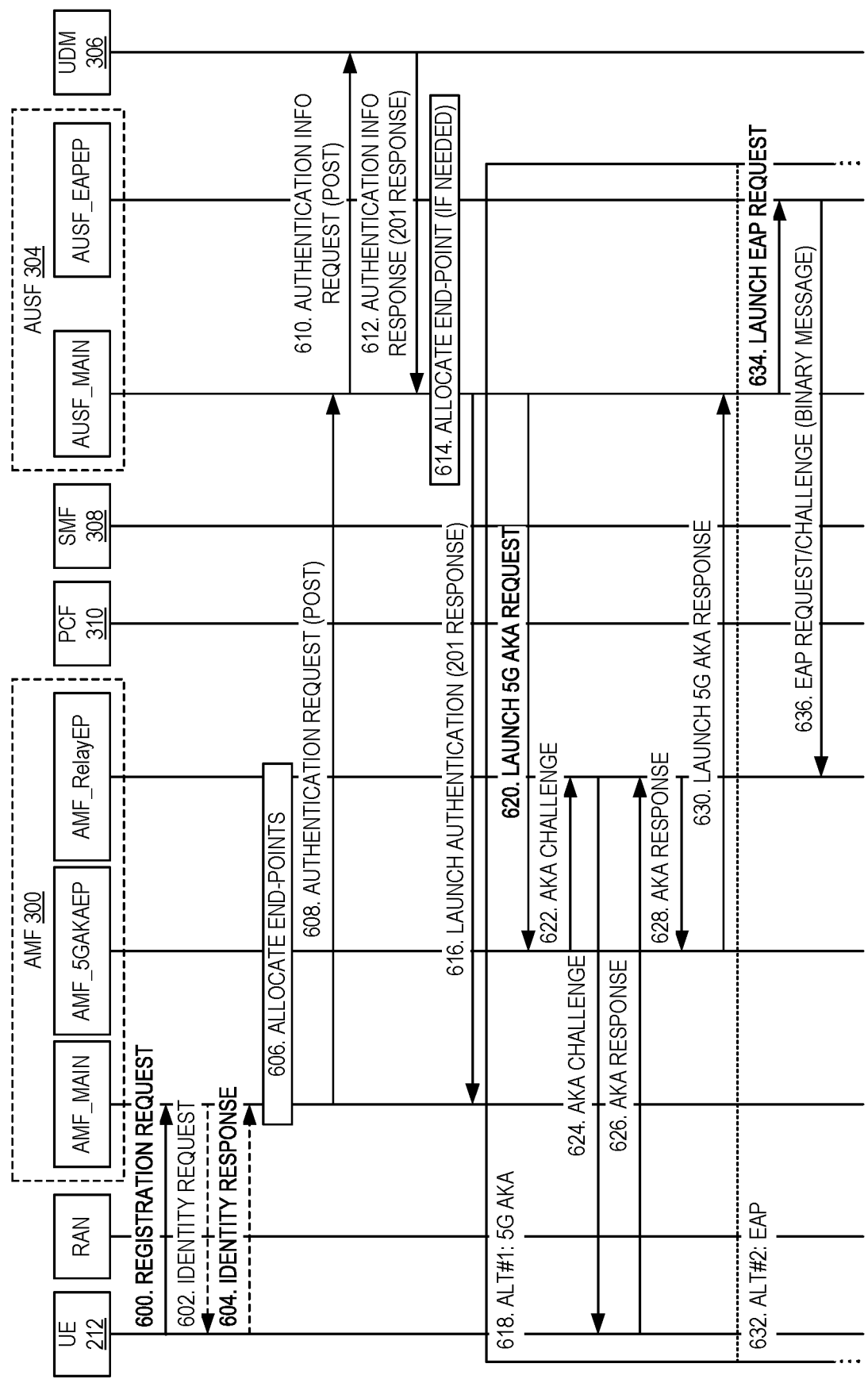
FIGS. 6A and 6B illustrate an authentication process in accordance with some other embodiments of the present disclosure.
Figure 6B:
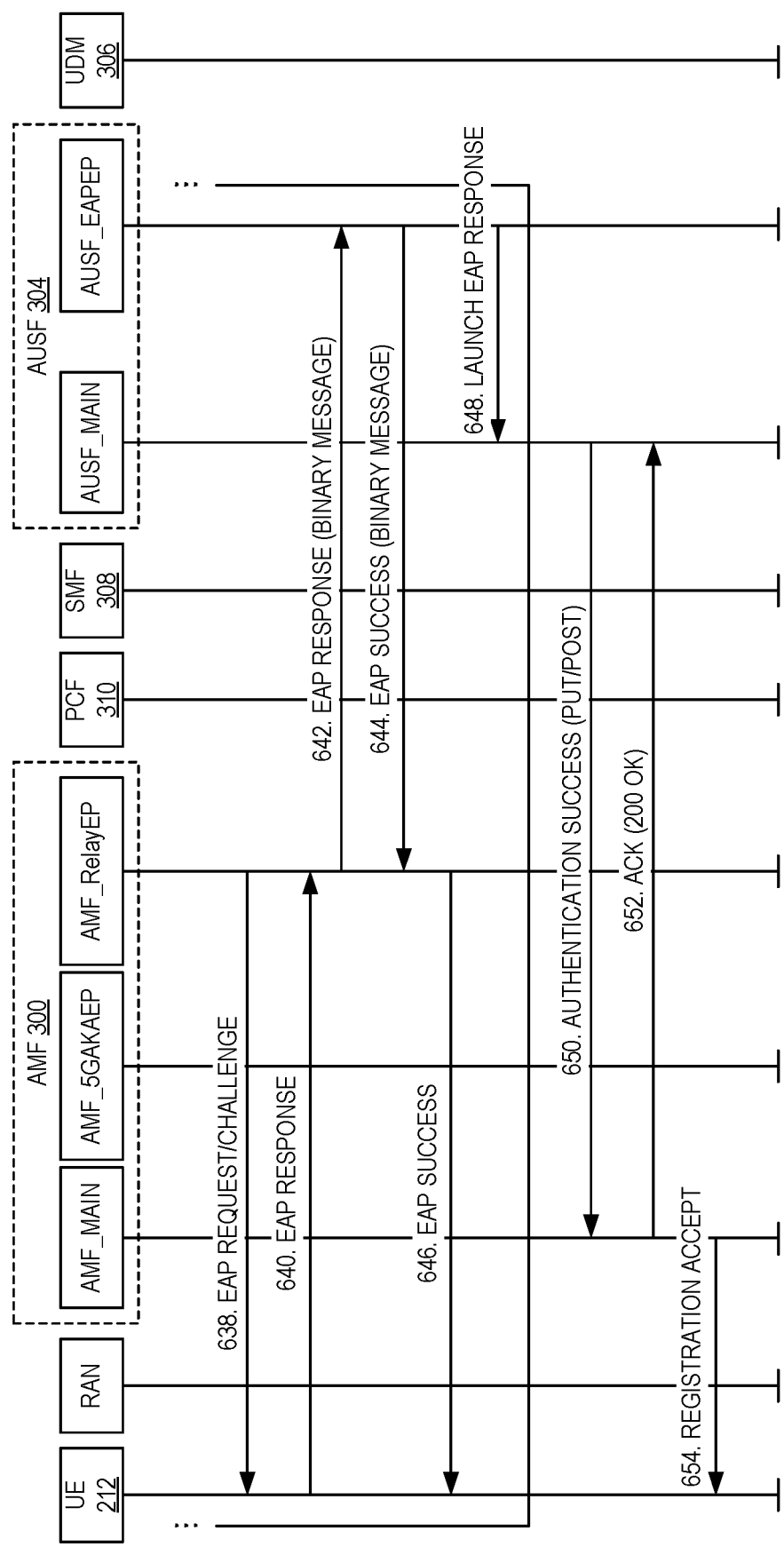

In another embodiment, the native AKA is designed in a way similar to how the EAP service is executed, e.g. by requesting the 5G AKA service from a separate service endpoint, i.e. the AMF_5GAKAEP endpoint, as illustrated in FIGS. 6A and 6B. In this case, the endpoints provided to the AUSF_Main service in the Launch Authentication Response in step 616 are the AMF_5GAKAEP endpoint for a respective AMF_5GAKAEP service (which uses a communication style desired for AKA authentication) and the AMF_RelayEP endpoint for the respective AMF_RelayEP service (which uses a communication style desired for EAP authentication). The new way of executing the authentication in alternative 1 is shown as steps 620-630, where steps 620 and 630 represent invoking the AMF_5GAKAEP service and reporting the result. In another embodiment of the present disclosure, the AMF_5GAKAEP service and AMF_Main service are one and the same service (still using the AMF_RelayEP service for the authentication messaging), in which case steps 620 and 630 would not be needed. Note that in FIGS. 6A and 6B, the alternative 2 is the same as in FIGS. 5A and 5B and is thus not further elaborated here (i.e., steps 634-648 in FIGS. 6A and 6B are the same as steps 532-550 in FIGS. 5A and 5B). Also note that steps 600-612 of FIG. 6A are also the same as steps 500-512 of FIG. 5A and, as such, the details are not repeated.

This new way of communicating (compared to using REST interfaces as FIG. 1) towards a certain service via a respective endpoint could be a Transmission Control Protocol (TCP)/IP socket opened from a particular address and port to another particular address and port. The endpoint addresses can be exchanged in the REST operation that initiates the authentication process (step 508 in FIG. 5A and step 608 in FIG. 6A). For instance, the AMF_Main service can indicate the port reserved for the relay service to this particular UE 212 in the POST message. If TCP is used, there is no need for Hypertext Transfer Protocol (HTTP) overhead, packaging EAP messages in JavaScript Object Notation (JSON) or HTTP headers, or any other complications—the messages can simply be sent directly as binary messages on top of TCP. However, the communication can also be something else (instead of using REST interfaces as in FIG. 1), e.g., a HTTP/2 or Quick User Datagram Protocol (UDP) Internet Connection (QUIC) stream could be opened for this purpose.

Note that while this description is based on the current Third Generation Partnership Project (3GPP) status, where services are bundled into network functions and where these network functions are providing multiple services (here illustrated by the AMF 300 and the AUSF 304 containing multiple services), one can foresee a situation where the notion of network functions is removed, and only services are the addressable entities in the 5G core network. The description in this section is by no means limited to the notion of network functions.

In another embodiment of the present disclosure, a service providing one or more endpoints to another service, e.g. as the AMF_Main service does in our examples, could also provide metadata together with the endpoints. This metadata could be related to the handling of the different endpoints or for other reasons. In our example it could, e.g., be local policy data guiding the selection of the authentication scheme.

Figure 7:
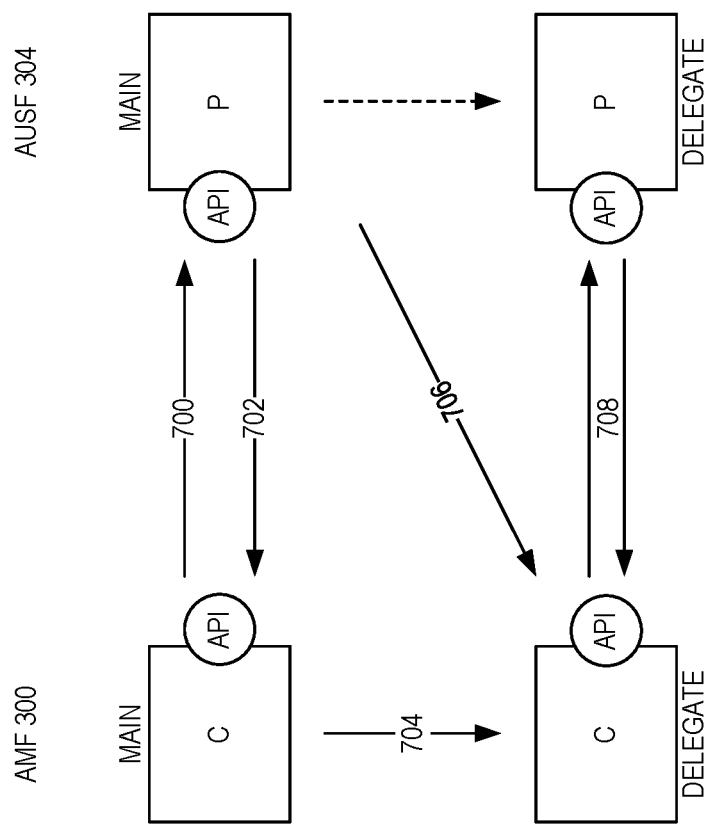
FIG. 7 illustrates interactions between service-oriented Access Management Function (AMF) and Authentication Service Function (AUSF) realizations in accordance with some embodiments of the present disclosure.

In FIG. 7, the interactions between service-oriented AMF 300 and AUSF 304 realizations are illustrated, where each has two kinds of services (also referred to as "entities"), a main service being the first point of contact (e.g., the AMF_Main service having the respective AMF_Main endpoint) and delegate services (e.g., AMF_RelayEP service and AMF_5GAKAEP service having respective endpoints) that can be tasked by the main service to handle individual sessions/transactions. Note that the details here are applicable to the example embodiments of FIGS. 5A, 5B, 6A, and 6B.

Action 700: Request for Authentication from main service (e.g., from the AMF_Main service to the AUSF_Main service via, e.g., HTTP/REST signaling): service with appended information:
  List of supported authentication schemes and associated communication styles
  Constraints including preferences per authentication scheme
  Uniform Resource Locator (URL) to delegates, i.e. the API endpoint(s), with security token Action 702: Response (e.g., from the AUSF_Main service to the AMF_Main service via, e.g., HTTP/REST signaling)
  Selected authentication scheme and optionally selected delegate(s)
  URL (addressing API Endpoint) and security token for delegate(s) (e.g., delegates of the AUSF_Main service such as, e.g., the AUSF_EAPEP service).

Action 704 (Optional): Redirection by main service (e.g., AMF_Main) to Delegate service
  If communication style of or class subscribe/notify AMF delegate may be required to interact with producer. In general, the communication may be of the type request/response or pub/sub. In the latter case, a consumer may subscribe to something from a producer. Later that producer may notify the consumer that the subscribed event has happened. If the communication is pub/sub, then in order to get the notify to the AMF delegate, the AMF delegate has to subscribe to the event.

Action 706 (Optional): Potential update notifications from the AUSF main service to the AMF delegate service Action 708: Service consumer (AMF Delegate service or AMF main service) communicates using a chosen communication style with the designated API endpoint, e.g. the endpoint of the AUSF delegate service, to receive the desired service. This communication enables, e.g., the EAP authentication execution shown in alternative 2 of FIGS. 5A and 5B and FIGS. 6A and 6B as well as the 5G-AKA authentication execution shown in alternative 1 of FIG. 6A. Note that the AMF is a proxy for the "real" consumer, which is the UE. Thus, the AMF is referred to here as a service consumer.

This embodiment (illustrated by FIG. 7) is not restricted to the communication between the AMF 300 and the AUSF 304. As anyone skilled in the art appreciates, it could be applied to any pair of NFs or NF services acting as service provider and consumer in the 3GPP Service-Based Architecture (SBA) context.

Figure 8:
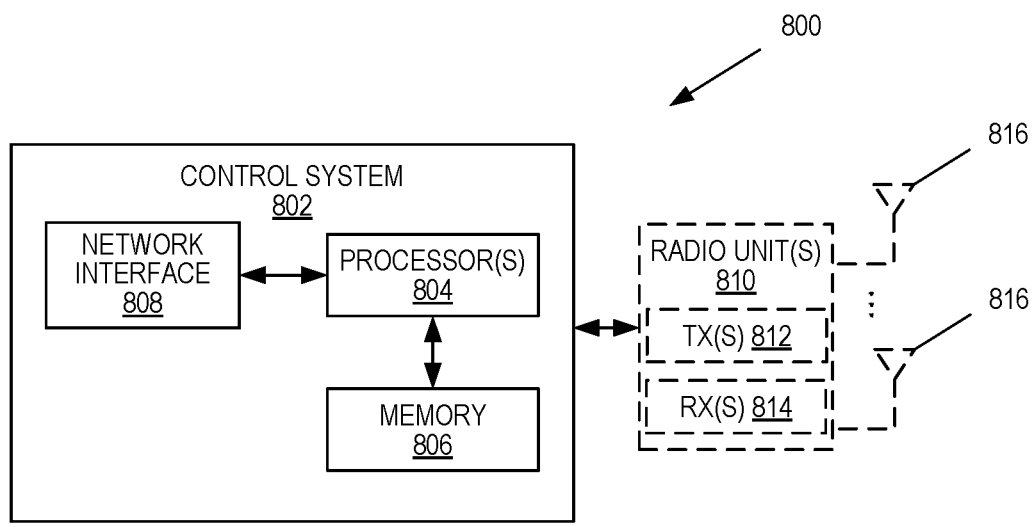
FIGS. 8 through 10 illustrate example embodiments of a network node.

FIG. 8 is a schematic block diagram of a network node 800 according to some embodiments of the present disclosure. The network node may be a radio access node (e.g., a base station or other node in the radio access network) or a core network (e.g., a physical node that implements one or more core network NFs and/or core network services). As illustrated, the network node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry.

In addition, in embodiments in which the network node 800 is a radio access node, the network node 800 includes one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802.

The one or more processors 804 operate to provide one or more functions of a network node 800, and in particular the functions of a network function(s) or service(s), as described herein. In some embodiments, the function(s) are implemented in software that is stored, e.g., in the memory 806 and executed by the one or more processors 804.

Figure 9:
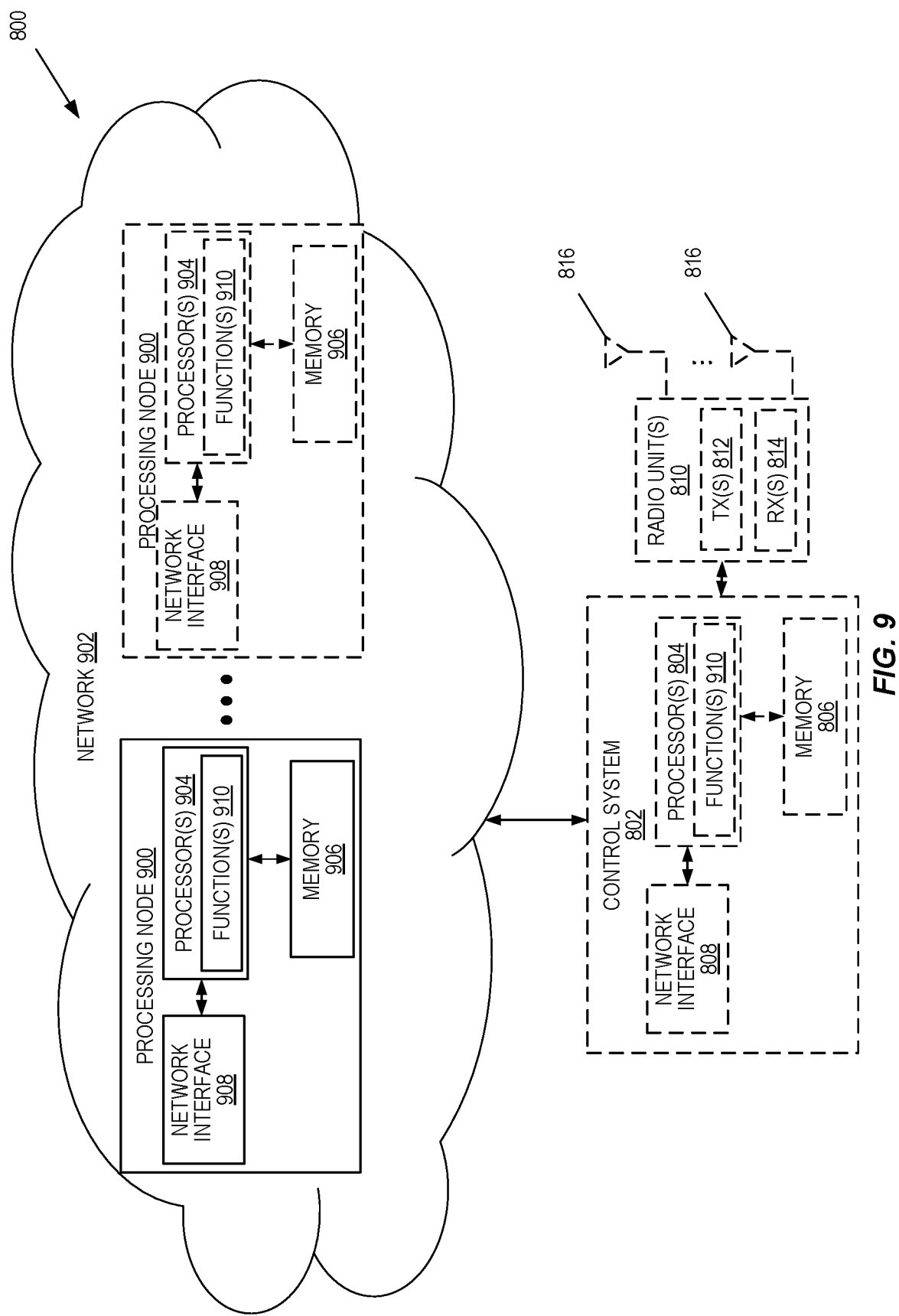

FIG. 9 is a schematic block diagram that illustrates a virtualized embodiment of the network node 800 according to some embodiments of the present disclosure. This discussion is equally applicable to other types of network nodes. Further, other types of network nodes may have similar virtualized architectures.

As used herein, a "virtualized" network node is an implementation of the network node 800 in which at least a portion of the functionality of the network node 800 is implemented as a virtual component(s) (e.g., via a virtual machine(s) executing on a physical processing node(s) in a network(s)). As illustrated, in some embodiments, the network node 800 includes the control system 802 that includes the one or more processors 804 (e.g., CPUs, ASICs, FPGAs, and/or the like), the memory 806, and the network interface 808 and, if the network node 800 is a radio access node, the one or more radio units 810 that each includes the one or more transmitters 812 and the one or more receivers 814 coupled to the one or more antennas 816, as described above. The control system 802 is connected to one or more processing nodes 900 coupled to or included as part of a network(s) 902 via the network interface 808. Each processing node 900 includes one or more processors 904 (e.g., CPUs, ASICs, FPGAs, and/or the like), memory 906, and a network interface 908.

In this example, functions 910 of the network node 800 (e.g., functions of the network function(s) or service(s) implemented by the network node 800) described herein are implemented at the one or more processing nodes 900 or distributed across the control system 802 and the one or more processing nodes 900 in any desired manner. In some particular embodiments, some or all of the functions 910 of the network node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910.

In some embodiments, a computer program including instructions which, when executed by at least one processor, causes the at least one processor to carry out the functionality of network node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
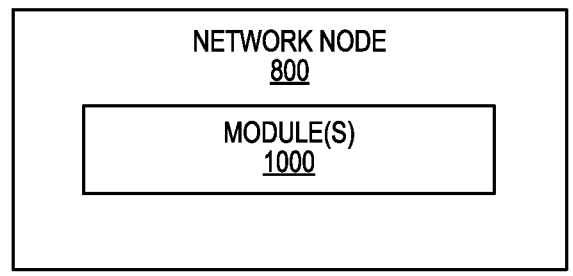

FIG. 10 is a schematic block diagram of the network node 800 according to some other embodiments of the present disclosure. The network node 800 includes one or more modules 1000, each of which is implemented in software. The module(s) 1000 provide the functionality of the network node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
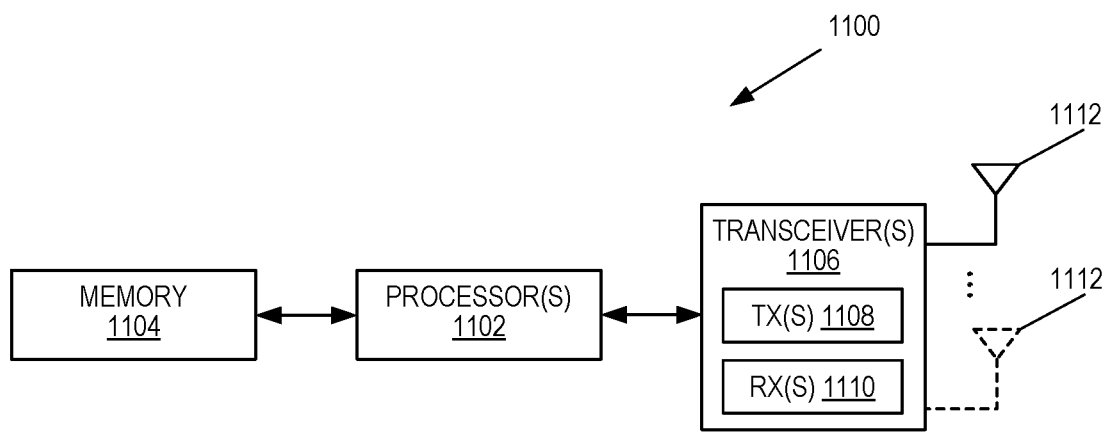
FIGS. 11 and 12 illustrate example embodiments of a User Equipment (UE).

FIG. 11 is a schematic block diagram of a UE 1100 according to some embodiments of the present disclosure. As illustrated, the UE 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The processors 1102 are also referred to herein as processing circuitry. The transceivers 1106 are also referred to herein as radio circuitry. In some embodiments, the functionality of the UE 1100 described above may be fully or partially implemented in software that is, e.g., stored in the memory 1104 and executed by the processor(s) 1102. Note that the UE 1100 may include additional components not illustrated in FIG. 11 such as, e.g., one or more user interface components (e.g., a display, buttons, a touch screen, a microphone, a speaker(s), and/or the like), a power supply (e.g., a battery and associated power circuitry), etc.

In some embodiments, a computer program including instructions which, when executed by at least one processor, causes the at least one processor to carry out the functionality of the UE 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
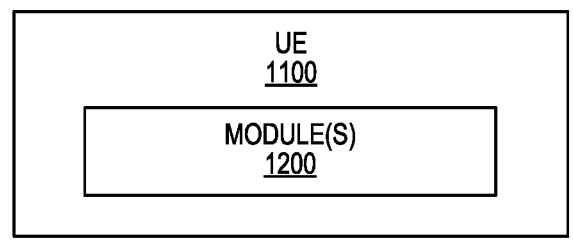

FIG. 12 is a schematic block diagram of the UE 1100 according to some other embodiments of the present disclosure. The UE 1100 includes one or more modules 1200, each of which is implemented in software. The module(s) 1200 provide the functionality of the UE 1100 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are:

Embodiment 1: A method of operation of a network node (800) implementing a second network function (e.g., AUSF) in a core network of a cellular communications system, comprising:

receiving (steps 508, 608, 700), at a main service (e.g., AUSF_Main service) of the second network function, a request from a first network function (e.g., AMF) for a desired service (e.g., UE authentication) via HTTP/REST signaling, the request comprising information that identifies one or more delegate endpoints (e.g., AMF_RelayEP endpoint, AMF_5GAKAEP endpoint) of the first network function that expose one or more delegate services, respectively, of the first network function for providing the desired service using one or more different communication styles; and initiating (steps 530, 532; steps 616 and 620 or steps 616 and 634; steps 702-706) the desired service using a selected delegate endpoint from the one or more delegate endpoints identified by the information comprised in the request.

Embodiment 2: The method of embodiment 1 wherein the communication style used by the selected delegate endpoint is a communication style that is different than HTTP/REST such that initiating the desired service using the selected delegate endpoint switches the communication style for signaling related to the desired service from HTTP/REST to the communication style used by the selected delegate endpoint.

Embodiment 3: The method of embodiment 1 or 2 wherein the communication style used by the selected delegate endpoint is a communication style that supports binary message exchange over a binary channel.

Embodiment 4: The method of embodiment 3 wherein the communication style used by the selected delegate endpoint is HTTP/2, QUIC stream, Server Push, Websocket, gRPC based messaging, or a native communication style over sockets.

Embodiment 5: The method of any one of embodiments 1 to 4 wherein the one or more delegate endpoints for providing the desired service using the one or more different communication styles comprise:

a first delegate endpoint (e.g., AMF_RelayEP endpoint) that uses a first communication style for the desired service; and a second delegate endpoint (e.g., AMF_5GAKAEP endpoint) that uses a second communication style for the desired service.

Embodiment 6: The method of embodiment 5 wherein at least one of the first communication style and the second communication style is a communication style that supports binary message exchange over a binary channel.

Embodiment 7: The method of embodiment 1 wherein: the desired service is authentication of a particular UE; the first network function is an AMF in a serving network of the UE; and the second network function is a AUSF in front of a UDM in a home network of the UE.

Embodiment 8: The method of embodiment 7 wherein:
the one or more delegate endpoints comprise a delegate endpoint for an EAP authentication relay service for relaying EAP related messages between the UE and the AUSF using a communication style that supports binary message exchange over a binary channel; and
the selected delegate endpoint is the delegate endpoint for the EAP authentication relay service.

Embodiment 9: The method of embodiment 8 wherein the communication style that supports binary message exchange over a binary channel is HTTP/2, QUIC stream, Server Push, Websocket, gRPC based messaging, or a native communication style over sockets.

Embodiment 10: The method of embodiment 8 or 9 wherein initiating the desired service using the selected delegate endpoint comprises:
sending, to a delegate endpoint of the AUSF, a request to launch the authentication of the UE using the selected delegate endpoint of the AMF; and
sending, to a main endpoint of the AMF that exposes the main service of the AMF via HTTP/REST signaling, a message that indicates launch of EAP authentication of the UE (e.g., indicates launch of EAP authentication of the UE using the selected delegate endpoint of the AMF).

Embodiment 11: The method of embodiment 10 further comprising:
receiving, from the delegate endpoint of the AUSF, a response that indicates that the authentication of the UE was successful;
sending, to the main endpoint of the AMF via HTTP/REST signaling, a message that indicates that the authentication of the UE was successful; and
receiving, from the main endpoint of the AMF via HTTP/REST signaling, an acknowledgement.

Embodiment 12: The method of embodiment 8 or 9 wherein initiating the desired service using the selected delegate endpoint comprises sending, to a main endpoint of the AMF that exposes the main service of the AMF via HTTP/REST signaling, a message that indicates launch of EAP authentication of the UE (e.g., indicates launch of EAP authentication of the UE using the selected delegate endpoint of the AMF).

Embodiment 13: The method of embodiment 12 further comprising:
sending, to the selected delegate endpoint of the AMF via the communication style that supports binary message exchange over a binary channel, an EAP
Request/Challenge to be relayed to the UE;
receiving, from the selected delegate endpoint of the AMF via the communication style that supports binary message exchange over a binary channel, an EAP response relayed from the UE;
sending, to the selected delegate endpoint of the AMF via the communication style that supports binary message exchange over a binary channel, an EAP Success message to be relayed to the UE;
sending, to the main endpoint of the AMF via HTTP/REST signaling, a message that indicates that the authentication of the UE was successful; and
receiving, from the main endpoint of the AMF via HTTP/REST signaling, an acknowledgement.

Embodiment 14: The method of embodiment 7 wherein:
the one or more delegate endpoints of the AMF comprise:
a first delegate endpoint for an EAP authentication relay service for relaying EAP related messages between the UE and the AUSF using a first communication style that supports binary message exchange over a binary channel; and
a second delegate endpoint for a 5G AKA authentication endpoint service for exchanging 5G AKA related messages with the AUSF or another endpoint associated with the AUSF using a second communication style (e.g., REST between AUSF_Main and AMF_5G1KAEP and, e.g., binary between AMF_5GAKAEP and AMF_RelayEP); and
the method further comprises:
determining whether an EAP authentication scheme or a 5G AKA authentication scheme is to be used to authenticate the UE;
selecting the first delegate endpoint of the AMF if the EAP authentication scheme is determined to be used for authenticating the UE; and
selecting the second delegate endpoint of the AMF if the 5G AKA authentication scheme is determined to be used for authenticating the UE.

Embodiment 15: The method of embodiment 14 wherein the EAP authentication scheme is determined to be used for authenticating the UE, and initiating the desired service using the selected delegate endpoint of the AMF comprises:
sending a message to a delegate endpoint of the AUSF to request launch of the authentication of the UE using the selected delegate endpoint of the AMF; and
sending, to a main endpoint of the AMF that exposes the main service of the AMF, a message to launch the authentication of the UE using the selected delegate endpoint of the AMF.

Embodiment 16: The method of embodiment 15 further comprising:
receiving, from the delegate endpoint of the AUSF, a response that indicates that the authentication of the UE was successful;
sending, to the main endpoint of the AMF via HTTP/REST signaling, a message that indicates that the authentication of the UE was successful; and
receiving, from the main endpoint of the AMF via HTTP/REST signaling, an acknowledgement.

Embodiment 17: The method of embodiment 14 wherein the EAP authentication scheme is determined to be used for authenticating the UE, and initiating the desired service using the selected delegate endpoint of the AMF comprises sending, to a main endpoint of the AMF that exposes the main service of the AMF via HTTP/REST signaling, a message that indicates launch of EAP authentication of the UE (e.g., indicates launch of EAP authentication of the UE using the selected delegate endpoint of the AMF).

Embodiment 18: The method of embodiment 17 further comprising:
sending, to the selected delegate endpoint of the AMF via the first communication style that supports binary message exchange over a binary channel, an EAP Request/Challenge to be relayed to the UE;
receiving, from the selected delegate endpoint of the AMF via the first communication style that supports binary message exchange over a binary channel, an EAP response relayed from the UE;
sending, to the selected delegate endpoint of the AMF via the first communication style that supports binary message exchange over a binary channel, an EAP Success message to be relayed to the UE;

sending, to the main endpoint of the AMF via HTTP/REST signaling, a message that indicates that the authentication of the UE was successful; and receiving, from the main endpoint of the AMF via HTTP/REST signaling, an acknowledgement.

Embodiment 19: The method of embodiment 14 wherein the 5G AKA authentication scheme is determined to be used for authenticating the UE, and initiating the desired service using the selected delegate endpoint of the AMF comprises sending, to the selected delegate endpoint of the AMF via the second communication style, a request to launch 5G AKA authentication for the UE.

Embodiment 20: The method of embodiment 19 further comprises:

receiving, from the selected delegate endpoint of the AMF via the second communication style, a response that indicates that the authentication of the UE was a success;

sending, to the main endpoint of the AMF via HTTP/REST signaling, a message that indicates that the authentication of the UE was successful; and receiving, from the main endpoint of the AMF via HTTP/REST signaling, an acknowledgement.

Embodiment 21: A network node (800) implementing a second network function (e.g., AUSF) in a core network of a cellular communications system, adapted to perform the method of any one of embodiments 1 to 20.

Embodiment 22: A network node (800) implementing a second network function (e.g., AUSF) in a core network of a cellular communications system, comprising:
  one or more processors; and
  memory comprising instructions executable by the one or more processors whereby the network node is adapted to perform the method of any one of embodiments 1 to 20.

Embodiment 23: A network node (800) implementing a second network function (e.g., AUSF) in a core network of a cellular communications system, comprising: one or more modules operable to perform the method of any one of embodiments 1 to 20.

Embodiment 24: A method of operation of a network node (800) implementing a first network function (e.g., AMF) in a core network of a cellular communications system, comprising:

sending (steps 508, 608, 700), to a main endpoint (e.g., AUSF_Main endpoint) of a second network function (e.g., AUSF) that exposes a main service of the second network function, a request for a desired service (e.g., UE authentication) via HTTP/REST signaling, the request comprising information that identifies one or more delegate endpoints (e.g., AMF_RelayEP, AMF_5GAKAEP) of the first network function that expose one or more delegate services, respectively, of the first network function for providing the desired service using one or more different communication styles; and receiving (steps 530, 532; steps 616 and 620 or steps 616 and 634; steps 702-706), from the main endpoint of the second network function via HTTP/REST signaling, a message that initiates launch of the desired service using a selected delegate endpoint from the one or more delegate endpoints identified by the information comprised in the request.

Embodiment 25: The method of embodiment 24 wherein the communication style used by the selected delegate endpoint is a communication style that is different than HTTP/REST such that initiating the desired service using the selected delegate endpoint switches the communication style for signaling related to the desired service from HTTP/REST to the communication style used by the selected delegate endpoint.

Embodiment 26: The method of embodiment 24 or 25 wherein the communication style used by the selected delegate endpoint is a communication style that supports binary message exchange over a binary channel.

Embodiment 27: The method of embodiment 26 wherein the communication style used by the selected delegate endpoint is HTTP/2, QUIC stream, Server Push, Websocket, gRPC based messaging, or a native communication style over sockets.

Embodiment 28: The method of any one of embodiments 24 to 27 wherein the one or more delegate endpoints for providing the desired service using the one or more different communication styles comprise:
  a first delegate endpoint (e.g., AMF_RelayEP endpoint) that uses a first communication style for the desired service; and
  a second delegate endpoint (e.g., AMF_5GAKAEP endpoint) that uses a second communication style for the desired service.

Embodiment 29: The method of embodiment 28 wherein at least one of the first communication style and the second communication style is a communication style that supports binary message exchange over a binary channel.

Embodiment 30: The method of embodiment 24 wherein: the desired service is authentication of a particular UE; the first network function is an AMF in a serving network of the UE; and the second network function is a AUSF in front of a UDM in a home network of the UE.

Embodiment 31: A network node (800) implementing a first network function (e.g., AMF) in a core network of a cellular communications system, adapted to perform the method of any one of embodiments 24 to 30.

Embodiment 32: A network node (800) implementing a first network function (e.g., AMF) in a core network of a cellular communications system, comprising:
  one or more processors; and
  memory comprising instructions executable by the one or more processors whereby the network node is adapted to perform the method of any one of embodiments 24 to 30.

Embodiment 33: A network node (800) implementing a first network function (e.g., AMF) in a core network of a cellular communications system, comprising: one or more modules operable to perform the method of any one of embodiments 24 to 30.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AK Authentication Key
AKA Authentication and Key Agreement
AMF Access Management Function
API Application Program Interface
ASIC Application Specific Integrated Circuit
AUSF Authentication Service Function
CPU Central Processing Unit
CT Core Network and Terminals DN Data Network
DSP Digital Signal Processor
EAP Extensible Authentication Protocol
FPGA Field Programmable Gate Array
gNB New Radio Base Station
gRPC gRPC Remote Procedure Call
HTTP Hypertext Transfer Protocol
IP Internet Protocol
JSON JavaScript Object Notation
NAS Non-Access Stratum
NEF Network Exposure Function
NF Network Function
NG-RAN Next Generation Radio Access Network
NR New Radio
NRF Network Repository Function
NSSF Network Slice Selection Function
PCF Policy Control Function
QoS Quality of Service
QUIC Quick User Datagram Protocol Internet Connection
RAM Random Access Memory
RAN Radio Access Network
REST Representational State Transfer
ROM Read Only Memory
RRH Remote Radio Head
RU Round Trip Time
SBA Service-Based Architecture
SIM Subscriber Identity Module
SMF Session Management Function
TCP Transmission Control Protocol
TLS Transport Layer Security
TTLS Tunneled Transport Layer Security
UDM Unified Data Management
UDP User Datagram Protocol
UE User Equipment
UPF User Plane Function
URL Uniform Resource Locator Those skilled in the art will recognize improvements and modifications to the embodiments of the present disclosure. All such improvements and modifications are considered within the scope of the concepts disclosed herein.

REFERENCES

[1] ExtensibleWikipedia, https://en.wikipedia.org/wiki/Extensible_Authentication_Protocol.
[2] EAP-AKA', RFC 5448, http://tools.ietf.org/html/rfc5448.
[3] Overall 5G architecture: 3GPP TS 23.501 v15.0.0, 3rd Generation Partnership Project; Technical Specification Group Services and System Aspects; System Architecture for the 5G System; Stage 2 (Release 15) http://www.3gpp.org/ftp//Specs/archive/23_series/23.501/23501-f00.zip
[4] Overall 5G procedures: 3GPP TS 23.502 v15.0.0, 3rd Generation Partnership Project; Technical Specification Group Services and System Aspects; Procedures for the 5G System; Stage 2 (Release 15) http://www.3gpp.org/ftp//Specs/archive/23_series/23.502/23502-f00.zip
[5] Perfect Forward Secrecy extension to EAP-AKA', https://tools.ietf.org/html/draft-arkko-eap-aka-pfs-00
[6] 3GPP TS 33.501 v0.7.1 (Release 15) http://www.3gpp.org/ftp//Specs/archive/33_series/33.501/33501-071.zip
[7] HTTP/2, https://en.wikipedia.org/wiki/HTTP/2
[8] QUIC, https://en.wikipedia.org/wiki/QUIC
[9] Server Push, https://en.wikipedia.org/wiki/HTTP/2_Server_Push
[10] Websockets, https://en.wikipedia.org/wiki/WebSocket
[11] HTTP2 stream prioritization, https://developers.google.com/web/fundamentals/performance/http2/#stream_prioritization
[12] gRPC, https://grpc.io

What is claimed is:

1. A method of operation of a network node implementing a second network function in a core network of a cellular communications system, comprising:
receiving, at a main service of the second network function, a request from a first network function for a desired service via Hypertext Transfer Protocol/Representational State Transfer, HTTP/REST, signaling, the request comprising information that identifies one or more delegate endpoints of the first network function that expose one or more delegate services, respectively, of the first network function for providing the desired service using one or more different communication styles; and
initiating the desired service using a selected delegate endpoint from the one or more delegate endpoints identified by the information comprised in the request.

2. The method of claim 1 wherein the communication style used by the selected delegate endpoint is a communication style that is different than HTTP/REST such that initiating the desired service using the selected delegate endpoint switches the communication style for signaling related to the desired service from HTTP/REST to the communication style used by the selected delegate endpoint.

3. The method of claim 1 wherein the communication style used by the selected delegate endpoint is a communication style that supports binary message exchange over a binary channel.

4. The method of claim 3 wherein the communication style used by the selected delegate endpoint is HTTP/2, Quick User Datagram Protocol Internet Connection, QUIC, stream, Server Push, Websocket, gRPC Remote Procedure Call, gRPC, based messaging, or a native communication style over sockets.

5. The method of claim 1 wherein the one or more delegate endpoints for providing the desired service using the one or more different communication styles comprise:
a first delegate endpoint that uses a first communication style for the desired service; and
a second delegate endpoint that uses a second communication style for the desired service.

6. The method of claim 5 wherein at least one of the first communication style and the second communication style is a communication style that supports binary message exchange over a binary channel.

7. The method of claim 1 wherein:
the desired service is authentication of a particular User Equipment, UE;
the first network function is an Access Management Function, AMF, in a serving network of the UE; and
the second network function is an Authentication Service Function, AUSF, in front of a User Data Manager, UDM, in a home network of the UE.

8. The method of claim 7 wherein:
the one or more delegate endpoints comprise a delegate endpoint for an Extensible Authentication Protocol, EAP, authentication relay service for relaying EAP related messages between the UE and the AUSF using a communication style that supports binary message exchange over a binary channel; and the selected delegate endpoint is the delegate endpoint for the EAP authentication relay service.

9. The method of claim 8 wherein the communication style that supports binary message exchange over a binary channel is HTTP/2, Quick User Datagram Protocol Internet Connection, QUIC, stream, Server Push, Websocket, gRPC Remote Procedure Call, gRPC, based messaging, or a native communication style over sockets.

10. The method of claim 8 wherein initiating the desired service using the selected delegate endpoint comprises:
sending, to a delegate endpoint of the AUSF, a request to launch the authentication of the UE using the selected delegate endpoint of the AMF; and
sending, to a main endpoint of the AMF that exposes the main service of the AMF via HTTP/REST signaling, a message that indicates launch of EAP authentication of the UE.

11. The method of claim 10 further comprising:
receiving, from the delegate endpoint of the AUSF, a response that indicates that the authentication of the UE was successful;
sending, to the main endpoint of the AMF via HTTP/REST signaling, a message that indicates that the authentication of the UE was successful; and
receiving, from the main endpoint of the AMF via HTTP/REST signaling, an acknowledgement.

12. The method of claim 8 wherein initiating the desired service using the selected delegate endpoint comprises sending, to a main endpoint of the AMF that exposes the main service of the AMF via HTTP/REST signaling, a message that indicates launch of EAP authentication of the UE.

13. The method of claim 12 further comprising:
sending, to the selected delegate endpoint of the AMF via the communication style that supports binary message exchange over a binary channel, an EAP Request/Challenge to be relayed to the UE;
receiving, from the selected delegate endpoint of the AMF via the communication style that supports binary message exchange over a binary channel, an EAP response relayed from the UE;
sending, to the selected delegate endpoint of the AMF via the communication style that supports binary message exchange over a binary channel, an EAP Success message to be relayed to the UE;
sending, to the main endpoint of the AMF via HTTP/REST signaling, a message that indicates that the authentication of the UE was successful; and
receiving, from the main endpoint of the AMF via HTTP/REST signaling, an acknowledgement.

14. The method of claim 7 wherein:
the one or more delegate endpoints of the AMF comprise:
a first delegate endpoint for an EAP authentication relay service for relaying EAP related messages between the UE and the AUSF using a first communication style that supports binary message exchange over a binary channel; and
a second delegate endpoint for a Fifth Generation, 5G, Authentication and Key Agreement, AKA, authentication endpoint service for exchanging 5G AKA related messages with the AUSF or another endpoint associated with the AUSF using a second communication style; and
the method further comprises:
determining whether an EAP authentication scheme or a 5G AKA authentication scheme is to be used to authenticate the UE;
selecting the first delegate endpoint of the AMF if the EAP authentication scheme is determined to be used for authenticating the UE; and
selecting the second delegate endpoint of the AMF if the 5G AKA authentication scheme is determined to be used for authenticating the UE.

15. The method of claim 14 wherein the EAP authentication scheme is determined to be used for authenticating the UE, and initiating the desired service using the selected delegate endpoint of the AMF comprises:
sending a message to a delegate endpoint of the AUSF to request launch of the authentication of the UE using the selected delegate endpoint of the AMF; and
sending, to a main endpoint of the AMF that exposes the main service of the AMF, a message to launch the authentication of the UE using the selected delegate endpoint of the AMF.

16. The method of claim 15 further comprising:
receiving, from the delegate endpoint of the AUSF, a response that indicates that the authentication of the UE was successful;
sending, to the main endpoint of the AMF via HTTP/REST signaling, a message that indicates that the authentication of the UE was successful; and
receiving, from the main endpoint of the AMF via HTTP/REST signaling, an acknowledgement.

17. The method of claim 14 wherein the EAP authentication scheme is determined to be used for authenticating the UE, and initiating the desired service using the selected delegate endpoint of the AMF comprises sending, to a main endpoint of the AMF that exposes the main service of the AMF via HTTP/REST signaling, a message that indicates launch of EAP authentication of the UE.

18. A method of operation of a network node implementing a first network function in a core network of a cellular communications system, comprising:
sending, to a main endpoint of a second network function that exposes a main service of the second network function, a request for a desired service via Hypertext Transfer Protocol/Representational State Transfer, HTTP/REST, signaling, the request comprising information that identifies one or more delegate endpoints of the first network function that expose one or more delegate services, respectively, of the first network function for providing the desired service using one or more different communication styles; and
receiving, from the main endpoint of the second network function via HTTP/REST signaling, a message that initiates launch of the desired service using a selected delegate endpoint from the one or more delegate endpoints identified by the information comprised in the request.

19. The method of claim 18 wherein the communication style used by the selected delegate endpoint is a communication style that is different than HTTP/REST such that initiating the desired service using the selected delegate endpoint switches the communication style for signaling related to the desired service from HTTP/REST to the communication style used by the selected delegate endpoint.

20. A network node for implementing a first network function in a core network of a cellular communications system, comprising:
one or more processors; and
memory comprising instructions executable by the one or more processors whereby the network node is operable to:

send, to a main endpoint of a second network function that exposes a main service of the second network function, a request for a desired service via Hypertext Transfer Protocol/Representational State Transfer, HTTP/REST, signaling, the request comprising information that identifies one or more delegate endpoints of the first network function that expose one or more delegate services, respectively, of the first network function for providing the desired service using one or more different communication styles; and receive, from the main endpoint of the second network function via HTTP/REST signaling, a message that initiates launch of the desired service using a selected delegate endpoint from the one or more delegate endpoints identified by the information comprised in the request.

\* \* \* \* \*